United States Patent
Pérez Millán et al.

(10) Patent No.: US 12,385,826 B2
(45) Date of Patent: Aug. 12, 2025

(54) SYSTEM, ROBOT AND METHOD FOR MEASURING THE COLOR OF AN AREA OF A SAMPLE OR OF A VEHICLE'S PART

(71) Applicant: FYLA LASER, S. L., Paterna (ES)

(72) Inventors: Pere Pérez Millán, Paterna (ES); Javier Abreu Afonso, Paterna (ES)

(73) Assignee: FYLA LASER, S. L., Paterna (ES)

( * ) Notice: Subject to any disclaimer, the term of this patent is extended or adjusted under 35 U.S.C. 154(b) by 203 days.

(21) Appl. No.: 18/262,049

(22) PCT Filed: Jan. 7, 2022

(86) PCT No.: PCT/IB2022/050118
§ 371 (c)(1),
(2) Date: Jul. 19, 2023

(87) PCT Pub. No.: WO2022/157590
PCT Pub. Date: Jul. 28, 2022

(65) Prior Publication Data
US 2024/0133803 A1   Apr. 25, 2024

(30) Foreign Application Priority Data
Jan. 19, 2021  (EP) .................................... 21382038

(51) Int. Cl.
*G01N 21/25* (2006.01)
*G01J 3/02* (2006.01)
(Continued)

(52) U.S. Cl.
CPC .......... *G01N 21/251* (2013.01); *G01J 3/0208* (2013.01); *G01J 3/4412* (2013.01);
(Continued)

(58) Field of Classification Search
CPC .... G01N 21/251; G01N 21/255; G01N 21/47; G01N 21/8422; G01N 2021/1744;
(Continued)

(56) References Cited

U.S. PATENT DOCUMENTS

| 4,449,821 A | * | 5/1984 | Lee | ........................... G01J 3/10 356/319 |
| 2006/0109474 A1 | | 5/2006 | Imura | |

(Continued)

FOREIGN PATENT DOCUMENTS

FR    2941529 A1    7/2010

OTHER PUBLICATIONS

Ifarraguerri, Augie, N. Convers Wyeth, and Brian Gorin. "Optical design for an active standoff spectrometer with a broadband source." Optical Engineering 59.9 (2020): 092006-092006. (Year: 2020).*

(Continued)

*Primary Examiner* — Tarifur R Chowdhury
*Assistant Examiner* — Carlos Perez-Guzman
(74) *Attorney, Agent, or Firm* — Maier & Maier, PLLC

(57) ABSTRACT

A system, robot and method to measure the color of an area of a sample. The system includes a light source to emit spatially coherent light that includes a broad spectrum of wavelengths; an optical arrangement to scan an area of the sample, part-by-part, with a collimated beam of said light; an optical spectrometer to receive scattered light and measure an optical spectrum for each part; and a computing device. The optical arrangement includes a collimator and/or is configured to preserve collimated said spatially coherent light. The system is configured for synchronizing the scanning of the area with the recording of the optical spectra for the area's parts, the recording of the optical spectrum of each part lasting an optical spectrum integration time equal to the duration of the scan of said part. The computing device (Continued)

determines color coordinates, computes and analyzes an overall optical spectrum, calculates XYZ Tristimulus values.

19 Claims, 10 Drawing Sheets

(51) Int. Cl.
*G01J 3/44* (2006.01)
*G01N 21/17* (2006.01)
*G01N 21/47* (2006.01)

(52) U.S. Cl.
CPC .......... *G01N 21/255* (2013.01); *G01N 21/47* (2013.01); *G01N 2021/1744* (2013.01); *G01N 2021/4735* (2013.01); *G01N 2201/06113* (2013.01); *G01N 2201/105* (2013.01)

(58) Field of Classification Search
CPC . G01N 2021/4735; G01N 2201/06113; G01N 2201/105; G01J 3/0208; G01J 3/4412; G01J 3/0243; G01J 3/10; G01J 3/42; G01J 3/465; G01J 3/50
See application file for complete search history.

(56) References Cited

U.S. PATENT DOCUMENTS

| 2008/0174763 | A1 | 7/2008 | Ehbets et al. |
| 2016/0123815 | A1 | 5/2016 | Steenhoek |
| 2018/0180480 | A1 | 6/2018 | Iida et al. |
| 2020/0149961 | A1* | 5/2020 | Hidaka ................. G01J 3/2823 |
| 2020/0284657 | A1* | 9/2020 | Leblond ................ G01J 3/0289 |
| 2021/0238786 | A1* | 8/2021 | Pérez Millán ....... G01N 21/474 |

OTHER PUBLICATIONS

International Search Report issued on Apr. 14, 2022, in corresponding International Application No. PCT/IB2022/050118, 4 pages.

Ifarraguerri Augie et al, "Optical design for an active standoff spectrometer with a broadband source", Optical Engineering. vol. 59, No. 09, May 28, 2020, 11 pages.

Selci Stefano et al, "Supercontinuum ultra wide range confocal microscope for reflectance spectroscopy of living matter and material science surfaces", AIP Advances, Jan. 1, 2011 (Jan. 1, 2011), 11 pages.

Venable William H., "Accurate tristimulus values from spectral data", Color Research & Application, vol. 14, No. 5, Oct. 1, 1989, 8 pages.

Hitzenberger et al., "Measurement of the spatial coherence of superluminescent diodes", Journal of Modern Optics, 1999, vol. 46, No. 12, pp. 1763-1774.

Saastamoinen et al., "Spatial coherence measurement of polychromatic light with modified Young's interferometer", Optics Express, 2013, vol. 21, No. 4, pp. 4061-4071.

Wikipedia, "CIE 1931 color space", retrieved from https://en.wikipedia.org/wiki/CIE_1931_color_space, 15 pages.

Ifarraguerri et al., "Optical design for an active standoff spectrometer with a broadband source", Optical Engineering, 2020, vol. 59, No., 9, 11 pages.

* cited by examiner

SYSTEM, ROBOT AND METHOD FOR MEASURING THE COLOR OF AN AREA OF A SAMPLE OR OF A VEHICLE'S PART

TECHNICAL FIELD

The present invention is directed, in general, to color measurement. In particular, the present invention relates to a system, to a robot and to a method for measuring the color of an area of a sample. The present invention also concerns the use of said system, robot or method for measuring the color of a vehicle's part. The vehicle may for example be a boat, an airplane or an automobile such as a car, a motorcycle or a bus, and the vehicle's part may for example be an automobile' body such as a car's body.

BACKGROUND OF THE INVENTION

Some of the most demanding color measurement applications require systems and methods that can provide accurate color measurements at high speeds and at a low financial cost. Some further demanding applications additionally require measuring the color of objects from a distance, and with the ability to do this in combination with other parallel processes, e.g. processes happening in a production line in a factory. A great part of the available prior art in the field of color measurement does not meet several of the aforementioned demands, because it concerns systems and methods which for the purpose of achieving accurate and fast measurement require the use of complex and expensive equipment as well as the existence of special conditions, e.g. zero or very low environmental lighting, and/or placing the sample inside or in contact with a special casing, and/or touching the sample with the color measurement device, said special conditions being incompatible with the context in which the color measurement has to be taken. Likewise, determining accurately the color of a sample often requires performing accurate multi-angle measurements on said sample, but taking said multi-angle measurements from a distance and under strong lighting of the sample by the environment, is challenging.

Patent application document US 2018/0180480 A1 describes a multi-angle colorimeter that includes a light illuminating and receiving optical system, a spectroscopic block, a control unit, and a casing, and also describes that it is possible to measure the color of a sample of which an observed color is changed in accordance with a colorimetric observation direction at each of a plurality of light receiving angles. However, US 2018/0180480 A1 also describes that at the time of measuring color, a pressing portion of the casing is pressed against the sample.

Likewise, patent application document US 2006/0109474 A1 describes a multi-angle colorimeter for measuring an object, and the colorimeter includes an illumination system, a toroidal mirror, a light detecting system, a controller/calculator and a casing body that has a measurement opening, wherein the measurement opening is to oppose the object surface and has a perimeter for defining a predetermined measurement area on the object surface.

A paper by A. Ifarraguerri et al. [ref. 6] describes an optical design that projects broadband infrared energy from a supercontinuum source onto a target, and collects the backscattered return, for identification of chemical contamination on surfaces at distances of up to tens of meters. The identification of chemical contamination on the surface of a sample using infrared radiation is a different application compared to measuring the color of the sample. It is noted that the paper by A. Ifarraguerri et al. describes using an FTIR spectrometer, more specifically an FTIR interferometer, for first spectrally modulating the infrared light produced by the supercontinuum source, and then directing the modulated infrared light to the target. However, using an FTIR spectrometer before directing the IR light to the sample adds a technical complexity to the system and reduces the system's durability and robustness of operation. Moreover, considering that FTIR interferometers are generally sensitive to mechanical vibrations and other environmental disturbances, and are typically also bulky, their use in an optical set-up reduces the optical set-up's compactness, movability and durability, and can render very difficult to integrate such set-up in a structure that may need to be mobile during the measurements. It is also noted that the paper by A. Ifarraguerri et al. also describes using a beam sampler of the modulated (by the FTIR interferometer) transmitted light for directing the latter to a reference detector that measures the transmitted spectrum. This reduces the intensity of the light that is directed towards the sample, and hence, reduces the intensity of the backscattered light that is used for the desired measurement. This intensity reduction can ultimately reduce the signal-to-noise ratio of the measurement of the light that is scattered by the target, and hence, be detrimental to the quality of said measurement.

For the above it is understood that there are needed methods and systems for accurately measuring the color of a sample from a distance and with the ability for simultaneously offering multi-angle measurements, wherein said methods and system do not suffer the aforementioned drawbacks.

DESCRIPTION OF THE INVENTION

The present invention provides a system, a robot and a method to measure color, where color is measured remotely, in-line, or at-line or off-line, and in real time, the measurement being immune to surrounding illumination light. The system and method is non-invasive: after the analysis the sample under study remains undamaged and unaltered (e.g. there is no need for cutting a piece of the sample to measure its color). The invention is suitable to measure color of various materials such as textiles, polymers, organic materials, plastics, glass, metals, woods, ceramics and pigments (natural or synthetic) for painting or dyeing, among others. The invention allows for advanced color measurement within or closely to existing production lines or other complex setups. The invention offers a system that is easily scalable, robust and may be made to be compact and have a small form factor for being versatile and portable. The invention does not result to the use of very expensive equipment. The invention allows for measuring areas of different sizes and shapes. The invention allows for performing color mapping at high resolution.

To that end, embodiments of the present invention disclose a system to measure the color of an area of a sample, comprising: a light source configured to emit light to illuminate a sample; an optical arrangement configured to receive said light, to output and direct a collimated beam of said light towards the sample that is located at a given distance, and to collect scattered light from said sample upon said illumination, the optical arrangement comprising an optical device configured to change and dynamically orient a direction of the light (the collimated beam) towards the sample thereby scanning an area of the sample, part-by-part; an optical spectrometer configured to receive the collected scattered light and to record an optical spectrum of the scattered light for each (scanned) part; and a computing device operatively connected to the optical spectrometer. Part-by-part may be line-by-line or point-by-point or spot-by-spot. Preferably the area is scanned by illuminating on lines of the area, that is to say the area is scanned line-by-line. The scattered light received by the optical spectrometer may be or comprise back-scattered light, i.e. light that is back-scattered from the sample upon the illumination of the sample with the collimated beam.

In the proposed system, the light emitted by the light source comprises a spectrum of wavelengths that are emitted simultaneously, and said spectrum covers, continuously, at least a band of wavelengths within the visible range, from a first wavelength to a second wavelength. In addition, the light emitted by the light source is spatially coherent, at least for all the band's wavelengths from the first wavelength to the second wavelength. The spectrum is most preferably a broad spectrum, and for example a spectrum that is more than 10 nm or 50 nm or 100 nm wide.

It may be understood that since the collimated beam directed to the sample is a collimated beam of the broadband light that is emitted by the light source, the optical arrangement may be configured to operate without spectrally modulating the light it receives from the light source, and preferably without passing said light and the collimated beam via the optical spectrometer or any spectral modulator. Similarly, the optical arrangement preferably is configured to receive the light emitted by the light source and to output and direct the collimated beam of said light towards the sample without spectrally modulating said light received by the light source, and most preferably without passing said light and said collimated beam via the optical spectrometer or any spectral modulator. Therefore, it can be understood that the optical arrangement is most preferably configured to preserve the spectral characteristics (i.e. properties), in particular to preserve the spectral profile, of the light it receives from the light source. Hence, in a most preferred embodiment according to the invention, the system, particularly the system's optical arrangement, does not comprise any spectral modulator, e.g. does not comprise any interferometer, via which the light emitted by the light source would pass before reaching the sample. The advantages offered when the system does not spectrally modulate the light which is directed to the sample, are that the system is compact, robust and not expensive, because the system's optical arrangement does not need to comprise spectral modulator components which are generally expensive, complex, bulky and prone to braking and malfunctioning when the system experiences vibrations and environmental (e.g. temperature) changes. Moreover, when the system's optical arrangement does not comprise such optical modulator components, it can be integrated easily in a movable structure, such as a robot or a robot's robotic arm, for being able to take measurements while simultaneously moving (using the robot) the optical arrangement over the sample. Importantly, when the system's optical arrangement does not comprise an optical modulator and does not spectrally modulate the light that is emitted by the source and is directed to the sample, it does not need to sample said light for doing the measurement, and in particular does not need to redirect part of the modulated light to a reference detector such as the reference detector in the system described by A. Ifarraguerri et al. Hence, the system according to the present invention can operate with the collimated beam being directed to the sample at full power, without having to direct part of the beam away from a sample and to a reference detector, and hence, without having to reduce the intensity of the backscattered light nor reduce the signal-to-noise ratio of the measurement taken with the spectrometer using the backscattered light; such undesired reductions would overall be detrimental to the color measurement.

Moreover, the system is configured for, when the optical device scans the area, synchronizing the scanning of said area with the recording by the optical spectrometer of the optical spectra for the area's parts. Likewise, the system is configured so that the recording of the optical spectrum of each part (each part being scanned) lasts an optical spectrum integration time that is equal to the duration of the scan of said part by the optical device.

The optical arrangement, for outputting the collimated beam, is configured to preserve collimated said spatially coherent light if or when the latter is collimated, and/or said optical arrangement further comprises a collimator to perform a collimation of the spatially coherent light. Preferably the collimator is located at a specific distance from an end of the light source. Therefore, the spatially coherent light emitted by the light source may or may not be collimated when exiting the light source. Likewise said light may or may not be collimated before being received by the optical arrangement. The latter may preserve a collimation of the light by having optical elements that do not destroy said collimation. Likewise, the optical arrangement may comprise a collimator as mentioned above to cause or to improve a collimation of the light. Likewise, optionally the system may comprise a collimator in between said light source and the optical arrangement, for collimating light that goes from the source to the optical arrangement.

According to the above it is contemplated the option that the optical arrangement has a collimator, e.g. a collimating lens or a collimating mirror, located at a distance (corresponding to the focal length of the collimator) from an end of the light source to transform the spatially coherent light into a collimated beam.

The computing device is configured to determine color coordinates of the area of the sample in a given color space, by means of computing an overall optical spectrum from a statistical calculation over all or some of the optical spectra corresponding to all or some of the scanned parts of the area and by analyzing the overall optical spectrum, said analyzing comprising calculating the XYZ Tristimulus values corresponding to said overall optical spectrum. It can be clearly understood that computing the overall optical spectrum entails performing said statistical calculation i.e. computing the overall optical spectrum includes or is done by (by means of) performing said statistical calculation.

Said overall optical spectrum may optionally be the statistical average (mean), median or mode, among other statistical figures of merit, of all or some of the optical spectra corresponding to all or some of the scanned parts of the area. Preferably, said overall optical spectrum is the average (mean) optical spectrum, calculated over all the optical spectra corresponding to all the scanned parts of the area.

Optionally and preferably, the spatially coherent light source is or comprises a supercontinuum light source. Optionally the light source, e.g. said optional supercontinuum light source, comprises a nonlinear optical fiber or an optical fiber that is configured to be excited by light and to emit supercontinuum. Advantageously, this option may further allow having a compact, durable and portable system.

Optionally and preferably, the first wavelength is comprised in a range between 370 nm-460 nm, and the second wavelength is comprised in a range between 620 nm-780 nm. In a particular embodiment the first wavelength is 430 nm. In another particular embodiment the second wavelength is 750 nm. In another particular embodiment the first wavelength is 400 nm. In another particular embodiment the second wavelength is 780 nm. In yet another particular embodiment, the first wavelength is 380 nm and the second wavelength is 750 nm. Optionally controlling the first and second wavelength may improve the accuracy of the measurement and/or allow for adapting the system according to an expected color of a sample.

In an embodiment, the collimated beam has a maximum full-angle angular divergence of 0.46 degrees or less for all the wavelengths from the first wavelength to the second wavelength. Optionally and preferably said maximum full-angle angular divergence is of between 0.01 and 0.20 degrees for all the wavelengths from the first wavelength to the second wavelength. This option may allow for controlling the directionality and diameter of the beam and may contribute to accurately measuring samples at various distances from the system.

In an embodiment, the optical arrangement comprises the collimator that preferably is a collimating lens, and at a distance from the collimator, said distance corresponding to a focal length of the collimator, a diameter of the transversal section of the collimated beam is 5 mm or less, particularly less than 2.15 mm, for all the wavelengths from the first wavelength to the second wavelength, the diameter being considered at $1/e^2$ width. This option may contribute to achieving a high spatial resolution and a good signal-to-noise ratio during measurements.

In an embodiment, the diameter of a transversal section of the collimated beam, for all the wavelengths from the first wavelength to the second wavelength is of 10 mm or less at any distance of 1 m or less from a point at the optical arrangement, and/or said diameter is of 100 mm or less at any distance of 10 m or less from said point at the optical arrangement, the diameter being considered at $1/e^2$ width. Preferably said point is at the collimator when (if) the optical arrangement comprises said collimator. Likewise, optionally said point is at the optical exit from the optical arrangement, said optical exit being an optical port or an aperture or a material or a gap from which the optical beam exits the optical arrangement. Likewise, optionally said point is at the optical device that is configured to change and dynamically orient a direction of the light. These options may contribute to improving measuring samples at various distances, with good resolution, and even when the samples receive lots of other light from the environment.

In an embodiment, the beam quality factor $M^2$ of the collimated beam, for all the wavelengths from the first wavelength to the second wavelength, is comprised in a range between 1.0 and 2.0. In a particular embodiment, such quality factor $M^2$ is lower than 1.4. This option may contribute to controlling and optimizing the illumination of the sample by the system.

In an embodiment, the brightness of the collimated beam, composed of all the wavelengths from the first wavelength to the second wavelength, is of 1 mW/cm$^2$ or higher at any distance of 1 m or less from a point at the optical arrangement; optionally or complementary, said brightness is of 0.01 mW/cm$^2$ or higher at any distance of 10 m or less from said point at the optical arrangement, wherein said point preferably is at the collimator when (if) the optical arrangement comprises said collimator. In a particular embodiment, such brightness is of 136 mW/cm$^2$ at a distance of 1 m from the collimating lens, and of 2.8 mW/cm$^2$ at a distance of 10 m from the collimating lens. These options may contribute to optimizing the accuracy of the measurement.

Optionally and preferably, the optical device comprises a XY galvanometric mirror and the optical arrangement further includes a parabolic mirror with a hole located between the collimator and the optical device. Preferably, said parabolic mirror is configured to: allow the passage of the spatially coherent light towards the optical device via the hole: allow the collection and redirection of the back-scattered light from the sample towards the optical spectrometer; prevent the passage towards the optical spectrometer of light coming from direct reflection at the sample. In the optional case that the optical device includes or comprises said parabolic mirror, preferably said optical device is further configured to redirect the scattered light from the sample towards the parabolic mirror, the latter further being configured to redirect the scattered light towards the optical spectrometer. Some important advantages of using the aforementioned configuration with the parabolic mirror with the hole, are that the same aperture or optical channel may be used for both the transmission of the collimated beam and the collection of the scattered light, and that the optical arrangement is compact, operationally robust, and can be made to be portable and integrated in movable structures such for example in a robotic arm of a robot. Moreover, the system may collect efficiently the scattered light because it is not required to align different channels for the transmission of the collimated beam and the collection of the scattered light. It is possible to have in the system the aforementioned configuration with the parabolic mirror, because the system's optical arrangement needs not to, and indeed preferably does not, spectrally modulate the optical source's light for directing said light towards the sample.

An aspect of the invention concerns a robot that comprises the system according to the invention. The robot according to the invention preferably comprises a movable robotic arm, and the optical arrangement of the system is at the robotic arm or at a robotic head which is comprised by the robot and is at a first end of the robotic arm. More preferably the robotic head comprises an opening that is configured to allow the passage of the collimated beam towards the sample and to allow the passage of the scattered light towards the optical arrangement. The herein described embodiments of a robot according to the invention, are equivalent to respective embodiments of a system according to the invention, wherein said system further comprises a robot or any components of the herein described robot embodiments. Hence, an embodiment of a system according to the invention, comprises a robot or a robotic arm, and the optical arrangement of the system is at the robot, or at the robotic arm, and preferably at a robot's robotic head which is at a first end of the robotic arm.

In a preferred embodiment of the robot according to the invention, the system comprises the collimator which is connected to the light source via a first optical fiber which is configured to guide towards the collimator the light emitted by the light source, and the system further comprises a coupler that is connected to the optical spectrometer via a second optical fiber, wherein said coupler is configured to collect the scattered (by the sample) light which is collected and redirected by the parabolic mirror, and the second optical fiber is configured to guide towards the optical spectrometer the scattered light which is collected by the coupler. More preferably the first and the second optical fibers, or parts thereof, are arranged, e.g. extend, along a length of the robotic arm. In a preferred embodiment, the light source is a supercontinuum light source and the first optical fiber is part of the light source (i.e. the light source comprises the first optical fiber) and said first optical fiber is configured to generate the light source's supercontinuum emission. The optical spectrometer and the light source may optionally be outside or adjacent to the robotic arm, and preferably be adjacent to a base or a second end of the robotic arm, said second end being distant to the robotic arm's first end.

The aforementioned system or robot according to the invention, or the method described further below, can preferably be used for measuring the color of a vehicle's part e.g. for measuring the color of specific points, or areas or the entire surface of a car's body or of another part or component of a car or of another vehicle. In particular, a robotic arm according to the invention can be used in a car production or inspection line. Moreover, a robot or system according to the invention can be used for measuring the color of a sample with a curved surface, because a robotic arm of said robot can be configured to move across and over the curved surface. It should be understood that the optical device of the optical arrangement is not an essential part of the robot according to the present invention. The robot itself, e.g. the robotic arm of the robot may be configured to change and dynamically orient a direction of the light towards the sample thereby scanning an area of said sample, part-by-part. Therefore, the optical device or the XY galvanometric mirror therein, is not necessarily needed in the system or in a robot comprising said system. Therefore, it must be understood that the XY galvanometric mirror, or the entire optical device that comprises said mirror, can be absent from any of the embodiments of the invention described herein. However, it should be understood that having both the optical device and the robotic arm in embodiments of the invention is particularly advantageous because it can allow using different means for accurately directing and scanning the collimated beam towards and over (across) the sample's surface.

Embodiments of the present invention also disclose a method for measuring the color of an area of a sample. The method comprises emitting light with a light source for illuminating a sample located at a given distance by a light source, the light comprising a broad spectrum of wavelengths that are emitted simultaneously, the spectrum covering continuously, at least, a band of wavelengths within the visible range, from a first wavelength to a second wavelength, and the light being spatially coherent, at least at all wavelengths from the first wavelength to the second wavelength; receiving the spatially coherent light at an optical arrangement located at a distance from an end of the light source; at the optical arrangement, preserving collimated the spatially coherent light if the latter is collimated, and/or collimating with a collimator said spatially coherent light; outputting and directing, by the optical arrangement, a collimated beam of the spatially coherent light towards the sample that is located at a given distance from the optical arrangement; scanning an area of the sample, part-by-part, by an optical device of the optical arrangement changing and dynamically orienting a direction of the directed collimated beam; recording, by an optical spectrometer, an optical spectrum of scattered light collected from the sample for each (scanned) part; synchronizing the scanning of said area with the recording by the optical spectrometer of the optical spectra for the area's parts, wherein the recording of the optical spectrum of each part lasting an optical spectrum integration time that is equal to the duration of the scan of said part by the optical device; and measuring, by a computing device operatively connected to the optical spectrometer, color coordinates of the area of the sample in a given color space by means of computing an overall optical spectrum from a statistical calculation over all or some of the optical spectra corresponding to all or some of the scanned parts of the area and by (by means of) analyzing the overall optical spectrum, said analyzing comprising calculating the XYZ Tristimulus values corresponding to said overall optical spectrum.

In the method, optionally and preferably the given distance of the sample's location from the optical arrangement is 0.5 m or longer. Optionally, the method comprises providing the sample at the given distance.

In an embodiment, a time dependent voltage signal is used for performing said synchronizing. Preferably, said voltage signal is squared.

In an embodiment, the sample while being illuminated with the collimated beam further receives other light from the environment.

In an embodiment, the optical spectrum integration time is determined by continuously scanning, by the optical device, a portion of an area of a white reference; simultaneously to said scanning of the portion, recording, by the optical spectrometer, the optical spectrum with different optical spectrum integration times, which are increased progressively and discretely with a certain constant time difference; and selecting as the optical spectrum integration time the maximum optical spectrum integration time for which the recorded optical spectrum is not saturated at any wavelength. Optionally and preferably said portion is a perimeter of said area of the white reference.

In an embodiment, calculating the XYZ Tristimulus values comprises: computing a reflectance curve using the overall optical spectrum of the area of the sample, an overall optical spectrum of a white reference and a background spectrum, preferably "overall" being "average"; multiplying the computed reflectance curve by a CIE standard illuminant spectral curve, by a CIE standard observer spectral curve and by a normalizing constant. It is noted that the CIE standard observer is described by 3 different spectral curves (functions), i.e. three CIE standard observer spectral curves (functions), each distinctively used for calculation of X, Y and Z, respectively [ref. 4, ref. 5].

In an embodiment, an angle of observation $\alpha$ is equal to $2*\theta$, where $\theta$ is the angle formed between the propagation direction of the collimated beam and the direction normal to the surface of the sample, and a is the angle of observation relative to the direction of a specular component reflected from the sample upon the incidence of the collimated beam on the surface of the sample, and the method further comprises using the optical device to vary the angle of observation $\alpha$ from a first angle of observation that preferably is 0 to a maximum angle $\alpha_{max}$, $\alpha_{max}$ being determined by a maximum scan angle that the optical device can provide, and measuring the color coordinates for each of a plurality of angles of observation $\alpha$ from the first angle of observation to said maximum angle $\alpha_{max}$.

Other embodiments of the invention that are disclosed herein also include software programs to perform the method embodiment steps and operations summarized above and disclosed in detail below. More particularly, a computer program product is one embodiment that has a computer-readable medium including computer program instructions encoded thereon that when executed on at least one processor in a computer system causes the processor to perform the operations indicated herein as embodiments of the invention.

BRIEF DESCRIPTION OF THE DRAWINGS

The previous and other advantages and features will be more fully understood from the following detailed description of embodiments, with reference to the attached figures, which must be considered in an illustrative and non-limiting manner, in which:

FIG. 7A also shows an angle of reflection of the specular component θ and angle of observation relative to the direction of the specular component α.

DETAILED DESCRIPTION OF PREFERRED EMBODIMENTS

Figure 1:
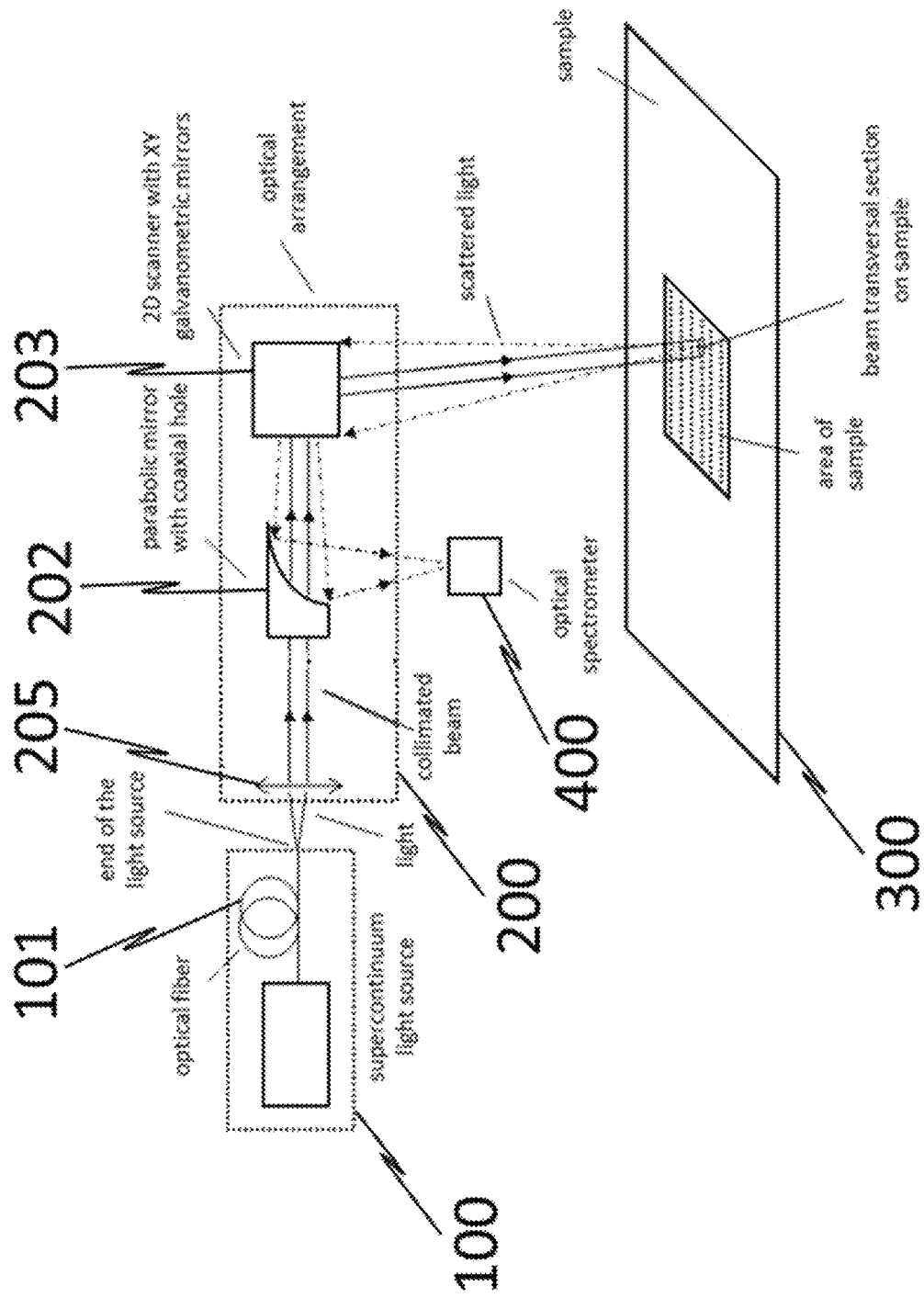
FIG. 1 schematically illustrates a system for measuring the color of an area of a sample, according to an embodiment of the present invention.

FIG. 1 shows an embodiment of the proposed system to measure the color of an area of a sample 300. Some non-limiting examples of said sample are: a textile, polymer, organic material, plastic, glass, metal, wood, ceramic, pigment (natural or synthetic), etc. In the embodiment of FIG. 1 the system includes a light source 100; an optical arrangement 200; an optical spectrometer 400 and a computing device (not shown) with one or more processors and at least one memory operatively connected to the optical spectrometer 400.

The light emitted by the light source 100 comprises a broad spectrum of wavelengths that are emitted simultaneously. Regarding the embodiment in FIG. 1, said spectrum covers continuously, at least, a band of wavelengths within the visible range, from a first wavelength (370-460 nm) to a second wavelength (620-780 nm).

The light emitted by the light source 100 is spatially coherent, at least for all wavelengths from the first wavelength to the second wavelength. Preferably said spatially coherent light is propagated in the form of a collimated beam, at least, as well, for all wavelengths from the first wavelength to the second wavelength. In accordance to known definitions, by spatially coherent light it should be understood light having a beam profile wherein the electric fields at different locations across the beam profile have a phase relationship that is fixed, and hence said electric fields are correlated. The spatial coherence of the light allows for rendering the used light highly directional, which in turn facilitates minimizing any optical losses of the system, as well as allowing for robust color measurements and possibly high resolution color mapping of the sample, even when the latter is far away from the system or receives lots of ambient light.

The spatially coherent light may preferably have a high degree of spatial coherence. The degree of spatial coherence may be determined, for example, by the modulus of the complex degree of mutual coherence $|γ_{12}(Δz≅0)|$, between pairs of points 1 and 2 over the transversal section of the beam [ref. 1], and measured, for example, by a fiber optic interferometer or by the method of the Young's double slit, as in [ref.1, ref.2]. For the spatially coherent light in the system, said modulus of the complex degree of mutual coherence may preferably be, for example, in a range between 0.5 and 1.0, preferably between 0.8 and 1.0, at least for all wavelengths from a first wavelength (370-460 nm) to a second wavelength (620-780 nm).

In a preferred embodiment, and also in the embodiment of FIG. 1, the light source is a fiber optic supercontinuum source, where the supercontinuum light is generated in an optical fiber and is delivered to the end of the source through said optical fiber (101) or through another optical fiber (101). In such embodiment, the end of the source is the end of said fiber (101) used to deliver the light of the supercontinuum source. In said preferred embodiment, the light is emitted to free space (e.g. air) from such end, which is the interface between the optical fiber and the free space (e.g. air), that can be in the form of a transversal polished interface (e.g. an ultra-physical contact connector, UPC) or an angled polished interface (e.g. an angled polished connector, APC), among others.

In said preferred embodiment the spectrum of the supercontinuum light covers continuously, at least, a band of wavelengths from a first wavelength (370-460 nm) to a second wavelength (620-780 nm). In said preferred embodiment all these wavelengths are propagated only in the fundamental transversal mode of the optical fiber used to deliver the supercontinuum light to the end of the light source. Consequently, the light emitted by the light source of this embodiment is spatially coherent, at least for all wavelengths from the first wavelength (370-460 nm) to the second wavelength (620-780 nm). From the end of the source all these wavelengths may be emitted simultaneously to free space.

Other non-limiting examples of light sources that can be used in the proposed system are, among others:

- A light source comprising a mode-locked laser, such as for example a Titanium-sapphire mode-locked laser, or a $Yb^{3+}$ mode-locked laser, or an $Er^{3+}$ mode-locked laser, among others, and also comprises a nonlinear crystal or a nonlinear optical fiber that is used to double or triple the infrared emission optical frequencies of the light radiation emitted by said mode-locked laser. The light emitted by said nonlinear crystal or a nonlinear optical fiber may be spatially coherent light.
- A light source comprising a spatially coherent superluminescent light emitting diode, known as SLD or SLED.
- A light source comprising a broadband light source, such as an incandescent lamp, a halogen lamp or a white light LED, among others, the broadband light source being configured for emitting spatially incoherent light, the light source also comprising a pinhole for spatially filtering and transforming said spatially incoherent light into spatially coherent light.
- A light source comprising a broadband light source, such as an incandescent lamp, a halogen lamp or a white light LED, among others, the broadband light source being configured for emitting spatially incoherent light, the light source also comprising a single mode optical fiber for transforming said spatially incoherent light into spatially coherent light, the broadband light source being coupled into the single mode optical fiber.
- A light source comprising a nonlinear crystal for generating supercontinuum light.

All the aforementioned sources may be spatially coherent in a broad band of wavelengths in the visible range and emit those wavelengths simultaneously. The light emitted by these sources may propagate naturally in the form of a collimated beam or may be transformed by a collimator, for example a collimator comprising a collimating mirror or a collimating lens or a set of collimating lenses, into a collimated beam. A light source may optionally comprise a collimator.

Optionally, for the cases where the light source does not emit naturally in the form of a collimated beam, the optical arrangement 200, as is the case in the embodiment of FIG. 1, comprises a collimator 205 adapted to transform the spatially coherent light into a collimated beam. In an embodiment, the optical arrangement has a collimator, and the latter is placed at a distance from the end of the source, said distance corresponding to the focal length of the collimator. In a preferred embodiment where the light source is a fiber optic supercontinuum source, such collimator is placed at a distance from the end of the source corresponding to the focal length of the collimator, such distance measured in the direction of the propagation axis of the optical fiber that delivers the supercontinuum light to the end of the source.

The collimated beam may have a full-angle angular divergence of 0.46 degrees or less for all the wavelengths from the first wavelength to the second wavelength. In a particular embodiment the cited full-angle angular divergence is between 0.01 and 0.20 degrees for all wavelengths from 430 to 780 nm. Likewise, optionally the diameter of a transversal section of the collimated beam, for all the wavelengths from the first wavelength to the second wavelength may be of 5 mm or less at a distance from the collimator 205 corresponding to a focal length of the collimator 205, and wherein the diameter is considered as the $1/e^2$ width of the beam, i.e, the distance between side points in the transversal section of the beam from the central maximum optical intensity point of the transversal section of the beam where the optical intensity is $1/e^2$ times such maximum optical intensity. In a particular embodiment the cited diameter at a distance from the collimator 205 corresponding to a focal length of the collimator 205, is between 2.1 mm and 2.15 mm for all wavelengths from 430 to 780 nm.

Complementary or alternatively, the diameter of a transversal section of the collimated beam, for all the wavelengths from the first wavelength to the second wavelength may be of 10 mm or less at any distance of 1 m or less from a point at the optical arrangement 200, and/or of 100 mm or less at any distance of 10 m or less from said point at the optical arrangement 200, wherein said point at the optical arrangement preferably is at the collimator 205 when/if the optical arrangement 200 comprises said collimator 205, and wherein the diameter is considered as the $1/e^2$ width of the beam, i.e, the distance between side points in the transversal section of the beam from the central maximum optical intensity point of the transversal section of the beam where the optical intensity is $1/e^2$ times such maximum optical intensity. In a particular embodiment where the optical arrangement comprises a collimator 205, the cited diameter is between 2.1 mm and 5.3 mm at a distance of 1 m from the collimator, for all wavelengths from 430 to 780 nm, and the cited diameter is between 5 mm and 37 mm for all wavelengths from 430 to 780 nm at a distance of 10 m from the collimator.

Figure 6:
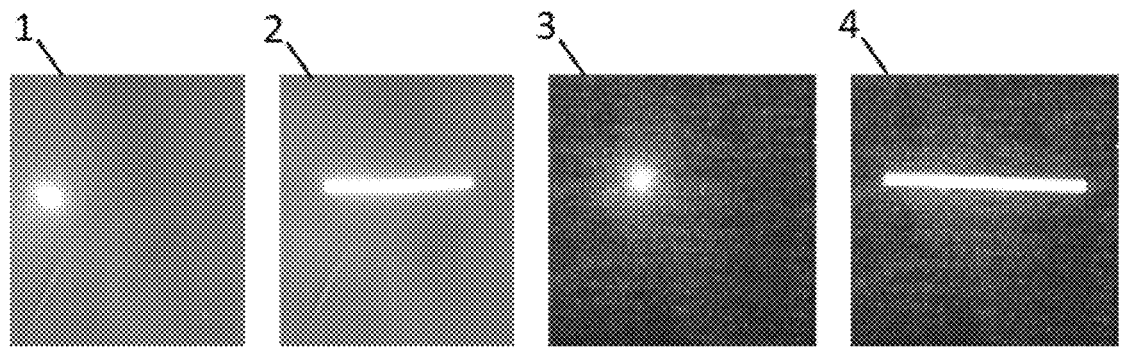
FIG. 6 shows pictures of the light scattered by textile samples illuminated by the collimated beam of the supercontinuum light source of an embodiment of present invention.

Consequently, in a particular embodiment where the system comprises a collimator, the diameter at $1/e^2$ width of the transversal section of the light beam incident on a sample placed at a distance of 1 m or less from a collimator is of 10 mm or less for all the wavelengths from the first wavelength to the second wavelength, and the diameter at $1/e^2$ width of the light beam incident on a sample placed at a distance of 10 m or less from the collimator, is of 100 mm or less for all the wavelengths from the first wavelength to the second wavelength. In a particular embodiment where the system comprises a collimator, the cited diameter is between 2.1 mm and 5.3 mm at a distance of 1 m from the collimator 205, preferably for all wavelengths from 430 to 780 nm, and the cited diameter is between 5 mm and 37 mm, preferably for all wavelengths from 430 to 780 nm, at a distance of 10 m from the collimator 205. For an illustrative purpose, FIG. 6 shows pictures of the light scattered by textile samples when illuminated by the collimated beam of the supercontinuum light source of an embodiment of the present invention. In the examples related to the pictures in FIG. 6 the value of the diameter (at $1/e^2$) of the transversal section of the beam incident on the samples is of between 2.1 and 5.3 mm for all wavelengths from 430 to 780 nm, and the distance of the samples from the collimating lens is of between 0.95 and 1 m for all positions of the beam in every sample.

The spatial resolution of the system, said spatial resolution being understood as the minimum area of a sample of which the system is able to provide color coordinates and to discriminate them from color coordinates of an adjacent area of the same magnitude, can be assumed to be the area of the light beam incident on the sample corresponding to the beam diameter at a $1/e^2$ width. Consequently, said spatial resolution may be 78.6 mm$^2$ or less for any sample placed at a distance of 1 m or less from a point at or within the optical arrangement, or may be 78.6 cm² or less for any sample placed at a distance of 10 m or less from a point at or within the optical arrangement. In a particular embodiment where the optical arrangement has a collimator, such spatial resolution is of 22.1 mm² at a distance of 1 m from the collimator and of 10.7 cm² at a distance of 10 m from the collimator.

The full angular divergence and the diameter of the collimated beam may have different values if measured in different directions of the plane of the transversal section of the beam. This may be the case for example, for a beam that has a transversal section of an elliptical shape. Hence, in the present invention, preferably the full angular divergence of the beam is the maximum full angular divergence of the beam among those measured in all directions of the plane of the transversal section of the beam. Likewise, in the present invention, preferably the diameter of the beam is the maximum diameter of the beam among those measured in all directions of the plane of the transversal section of the beam. In the optional and preferred case of a beam with a transversal section of circular shape, the angular divergence and the diameter of the beam are equal in all directions of the plane of the transversal section of the beam.

Optionally the beam quality factor $M^2$ of the collimated beam, for all the wavelengths from the first wavelength to the second wavelength, is comprised in a range between 1.0 and 2.0, being 1.0 the value of $M^2$ for a diffraction-limited Gaussian beam, and the minimum physically possible value of $M^2$ by definition, according to ISO Standard 11146 (2005) [ref.3]. Preferably said quality factor $M^2$ is lower than 1.4 for all the wavelengths from the first wavelength to the second wavelength. Optionally and preferably, the brightness of the collimated beam, composed of all the wavelengths from the first wavelength to the second wavelength, is of 1 mW/cm² or higher at any distance of 1 m or less from a point at the optical arrangement, and/or of 0.01 mW/cm² or higher at any distance of 10 m or less from said point at the optical arrangement, said point preferably being at the collimator when the optical arrangement comprises said collimator. In a particular embodiment wherein the optical arrangement comprises a collimator, such brightness is of 136 mW/cm² at a distance of 1 m from the collimating lens and of 2.8 mW/cm² at a distance of 10 m from the collimating lens.

At the same time that the sample 300 is illuminated by the collimated beam, the sample 300 can be illuminated by environmental light, or not illuminated at all. Unlike conventional systems configured to measure color of an area using spectrophotometers (where environmental light must be avoided to obtain a proper measurement of color), in the system of the present invention the measurement of color is immune to simultaneous illumination from environmental light (thus, the measurement can be done in spaces open to surrounding illumination). A contributing reason for this is the optional high brightness of the beam incident on the sample, in general much higher than the brightness of environmental illumination incident on the sample. Besides, advantageously the optical arrangement 200 is preferably designed to collect primarily light that is scattered from the sample in the same direction of the direction of propagation of the collimated beam and opposite in sign (back-scattered light). Therefore, the amount of scattered light from the sample collected by the spectrometer that is generated by the surrounding illumination is negligible and does not influence on the color measurement. In an embodiment, said effect is experimentally confirmed when brightness of the collimated beam incident on the sample is 3 orders of magnitude higher or more than the brightness of surrounding illumination incident on the sample.

Referring back to the explanation of FIG. 1, the optical arrangement 200 also includes a parabolic mirror 202 with a hole (not shown) and an optical device 203, such as an XY galvanometric mirror, which is located between the parabolic mirror 202 and the sample 300. The parabolic mirror 202 allows the passage of the spatially coherent light towards the optical device 203 via the hole, allows the collection and redirection of the scattered light from the sample 300 towards the optical spectrometer 400, and prevents the passage towards the optical spectrometer 400 of light coming from direct reflection at the sample. By preventing said passage towards the optical spectrometer 400 of the light coming from direct reflection at the sample, the signal-to-noise ratio and, thus, the quality of the measurements are improved. Moreover, the use of the parabolic mirror with the hole, and the optical arrangement 200 as shown in FIG. 1, advantageously renders the system compact, not-complex, non-expensive, robust, and easy to integrate in a movable structure which can permit moving the optical arrangement during and/or between measurements. Moreover, additional advantages of using the aforementioned optical arrangement with the parabolic mirror with the hole, are that the same aperture or optical channel may be used for both the transmission of the collimated beam and the collection of the scattered light, and that the system may collect efficiently the scattered light because it is not required to align different channels for the transmission of the collimated beam and the collection of the scattered light.

The optical device 203 is configured to change and dynamically orient a direction of the collimated beam towards the sample 300 performing a scan of an area of the sample 300, part-by-part, preferably line-by-line, to redirect the scattered light from the sample 300 towards the parabolic mirror 202, and to further redirect the scattered light towards the optical spectrometer 400.

Figure 2A:
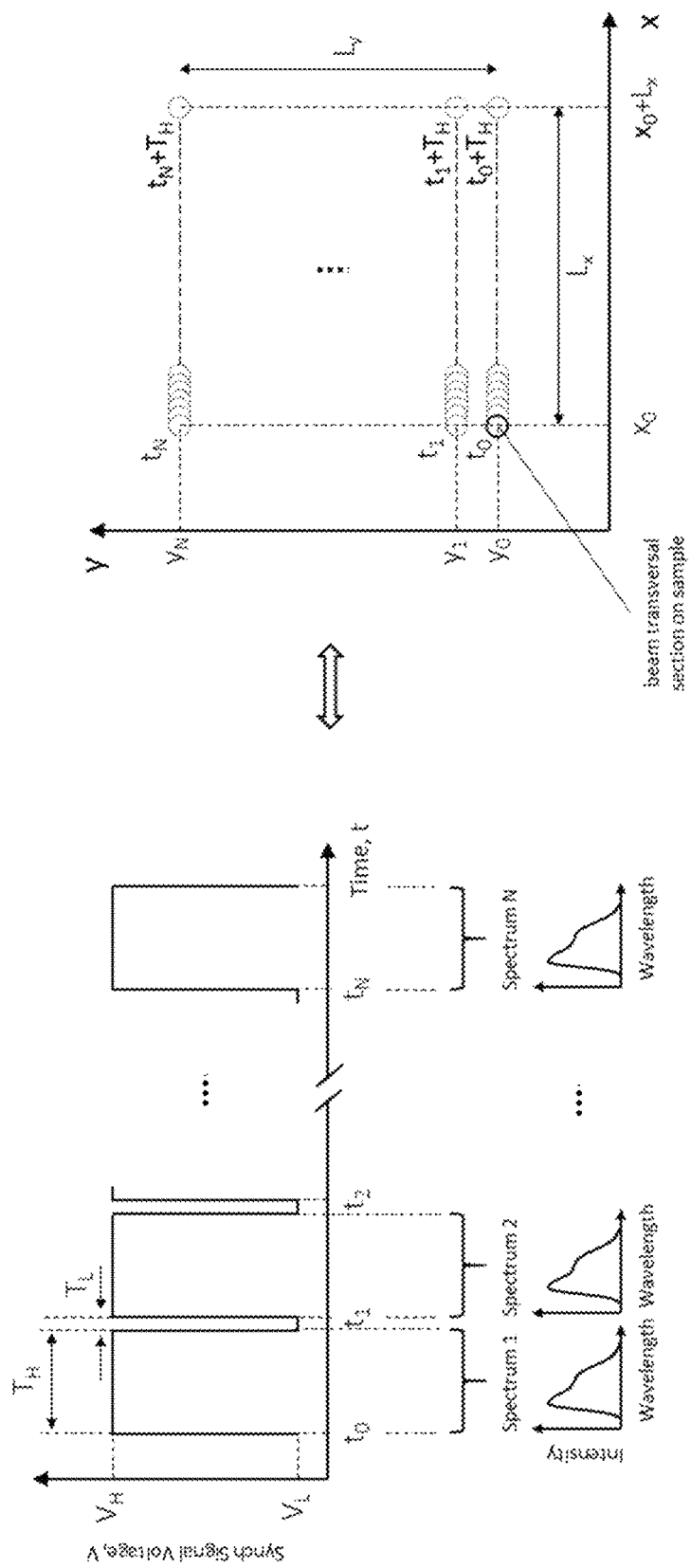
FIG. 2A sows a graphical explanation of the spatio-temporal procedure of synchronization between sample scanning and optical spectra recording.

As referred above, an area of the sample 300 is preferably scanned line-by-line. A more complete description of said line-by-line scanning process in an embodiment is as follows: as illustrated in FIG. 2A (right side of the figure), the collimated beam is oriented dynamically with the optical device 203 to impinge sequentially on different points of the sample. In FIG. 2A (right side of the figure) the positions of said points on the sample are represented with their corresponding coordinates (x,y). Sequentially, the beam is oriented from a position $(x_0,y_0)$ to a position $(x_0+L_x,y_0)$. This is understood as the scanning of a first line of length $L_x$. Next, the beam is oriented sequentially from a position $(x_0,y_1)$ to a position $(x_0+L_x,y_1)$, performing the scanning of a second line. Progressively, continuing this procedure, the sample is scanned with other lines (each one of arbitrary number n), from a position $(x_0,y_n)$ to a position $(x_0+L_x,y_n)$, until a complete area of the sample, of sides of lengths $L_x$ and $L_y$, is scanned.

Optionally, said scanning of an area can be performed by scanning only one single line. In practise, scanning a line may be performed illuminating one single point or spot of the sample, because the beam cross section or spot has a finite size. Therefore, the minimum area that can be scanned may be the area of the transversal section of the beam incident on the sample, which would correspond to the spatial resolution of the system as described above.

The optical spectrometer 400 is configured to measure an optical spectrum of the scattered light for each scanned part of the area.

The computing device runs/implements one or more algorithms that determine color coordinates of the area of the sample 300 in a given color space by computing an overall optical spectrum that preferably is an average optical spectrum. To do so, preferably all the optical spectra corresponding to all scanned parts are averaged and the XYZ Tristimulus values corresponding to the average optical spectrum are calculated. Optionally, the system may determine the color coordinates from a single scanned or illuminated part of the sample.

Therefore, the proposed system measures color using a collimated spatially coherent illuminating source allowing localized illumination at long distances, by pointing (or directing) the illuminating light with the cited optical device 203, that in a particular embodiment is composed of a pair of x,y movable galvanometric mirrors, but can be otherwise a rotating polygonal mirror, an acousto-optic deflector, or an electro-optic deflector based in propagation of light in a nonlinear crystal, among others. Thus, it is possible to scan large areas of a sample 300 with the optical device 203 at fast speed. In the proposed system, such area may for example range from 22 mm² to 2.25 m² (e.g. a square area of 1.5 m×1.5 m). The total scanning time of such area may for example range from 0.1 ms to 1000 s.

To measure the color of a given area of the sample 300, the scanning of said area is synchronized with the recording by the optical spectrometer (400) of the optical spectra for the area's parts, and the recording of the optical spectrum of each part lasts an optical spectrum integration time that is equal to the duration of the scan of said part by the optical device 203. The area is scanned part-by-part, as described above. For each part, the spectrometer 400 records one spectrum that corresponds to the scattered light collected during the time that it takes the optical device 203 to scan such part (i.e. the spectrometer integration time to record a spectrum matches the scanning time of a part). Preferably, during the time that it takes the optical device 203 to move to the first point of next part to be scanned, called time of flight, the spectrometer 400 remains passive. When next part is scanned, the spectrometer 400 records a new spectrum, and so on until every part of the scanned area has a corresponding spectrum recorded by the spectrometer 400.

FIG. 2A illustrates a graphical explanation of a non-limiting example of the procedure of synchronization between sample scanning and optical spectra recording in an embodiment where the area is scanned line-by-line, and said example is as follows: A squared voltage signal (represented as function of time in left side (up) in FIG. 2A) is used to synchronize scanning and spectrum recording times. This voltage signal feeds the sync input port of the optical device 203 and the sync input port of the spectrometer 400 simultaneously. When the signal changes from low state voltage, $V_L$, to high state voltage, $V_H$, (rise trigger event), the movement of the optical device 203 to scan a line and the spectrum recording begin simultaneously. This rise trigger event occurs at time $t_n$ for each scanning line of arbitrary number n, from n=0 to n=N. During high state of the signal (integration time $T_H$), the optical device 203 scans a line on the sample, from point $(x_0, y_n)$ to point $(x_0+L_x, y_n)$, and the spectrometer 400 records a spectrum n, integrating the photodetected signal produced by all the back-scattered light collected during the integration time $T_H$. When the signal changes from high state voltage to low state voltage (fall trigger event) the movement of the optical device 203 to translate the collimated beam to the first point of the next line begins, and the spectrometer 400 stops the spectrum recording. During the low state of the signal (time of flight $T_L$), the optical device 203 translates the collimated beam to the first point of the next line, and the spectrometer 400 remains passive. This procedure is repeated sequentially until all lines of the area from n=0 to n=N are scanned and a spectrum n for each line n is recorded. A computing device operatively connected with the spectrometer performs a statistical calculation, thereby calculating an overall spectrum, using all or a few of the spectra corresponding to all lines, and preferably said computing device calculates an average spectrum by averaging all the spectra corresponding to all lines.

Figure 2B:
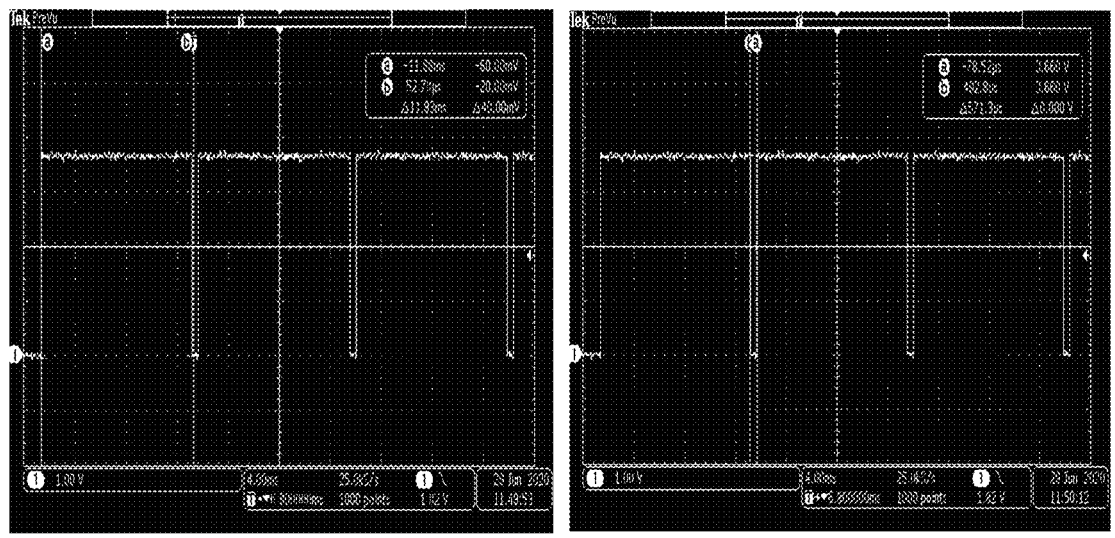
FIG. 2B shows an oscilloscope trace of an example of voltage signal for synchronization between galvanometric scanner and optical spectrometer.

FIG. 2B shows an oscilloscope trace of an example of voltage signal for synchronization between a galvanometric scanner and an optical spectrometer in an embodiment of the present invention, where the integration time $T_H$ is 11.93 milliseconds and the time of flight $T_L$ is 571.3 microseconds.

In an embodiment, for the purpose of calculating the color of the sample 300, there are measured: the spectrum of scattered light from the sample 300, and also the spectrum of scattered light from a white reference. Thus, in an embodiment, the procedure explained above is performed to obtain the average spectrum of back-scattered light of an area of the sample 300 and also to obtain the average spectrum of back-scattered light of a white reference. Most preferably the white reference is placed at the same distance from the system, as the sample 300. Likewise, most preferably the white reference's scanned area is of the same magnitude as the sample's scanned area. Preferably, the white reference is measured before measuring the sample.

Figure 3A:
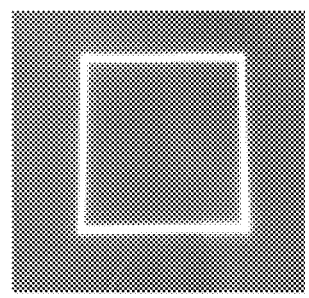
FIGS. 3A-E illustrate pictures and graphs of the sequential steps in an example of a procedure that is used to obtain the reflectance spectrum of an area of a textile sample, according to an embodiment of the present invention; in this example the color coordinates of said area are obtained in the CIE L*ab space, illuminant D50, observer 2°.

Best accuracy in the determination of color is obtained in the preferred case that the full dynamic range of the spectrometer 400 is exploited when recording the spectra of the white reference and of the sample 300. Such full dynamic range may be obtained when the spectrometer's integration time for recording an optical spectrum is set to be equal to the maximum optical spectrum integration time for which the spectrometer response, and therefore the recorded optical spectrum, is not saturated at any wavelength. In an embodiment of the proposed method, the maximum optical spectrum integration time is determined before saturation, as follows: the optical device 203 is configured/programmed to continuously scan a portion, preferably a perimeter, of an area of a white reference (as illustrated in FIG. 3A). Simultaneously, the spectrometer 400 is configured/programmed to record spectra with different integration times, which are increased progressively and discretely with a certain constant time difference. The maximum of these integration times for which its corresponding recorded spectrum is not saturated at any wavelength is set as the integration time for the recording of the reference spectra and of the sample spectra, and is set correspondingly as the time in high state voltage of the synchronizing signal between scanner and spectrometer (integration time $T_H$), referred above and illustrated in FIG. 2A. This determination of the integration time is made with the white reference because the latter will scatter a higher proportion of intensity than the sample 300, thus the spectrometer 400 will not be saturated by the scattered light from the sample 300 if it is not saturated by the scattered light from the white reference, provided the integration time is the same for both cases.

The required integration time $T_H$ determined as referred above may decrease with the brightness of the collimated beam. As an example, the integration time $T_H$ may be inversely proportional to the brightness of the collimated beam. As an example, in an embodiment where an integration time $T_H$ is of 1622.48 ms for a brightness of the collimated beam of 1 mW/cm² (said brightness composed of all wavelengths from 430 to 780 nm and measured at a distance of 1 m from a collimator 205), said integration time $T_H$ is of 11.93 ms for a value of said brightness of 136 mW/cm².

In an embodiment, the XYZ Tristimulus values are calculated by performing the following steps:

Step 1. Measurement of spectra:

Measurement of the spectrum of an area of the white reference, obtained with the synchronous procedure explained above.

Measurement of the spectrum of the background, recorded during the integration time $T_H$ determined as explained above. The background is the noise recorded by the spectrometer that is produced by detected environmental light and/or by intrinsic electrical noise of the spectrometer. The background spectrum is recorded having the illuminating collimated beam switched off or blocked (e.g. with an electromechanical shutter that is optionally comprised by the system) at a point that is at the light source, or in between the light source and the sample, or in between the optical device 203 and the light source.

Measurement of the spectrum of an area of the sample 300, obtained with the synchronous procedure explained above. The area of the sample and the area of the white reference are equal, and are placed at the same distance from the end of the illuminating source.

Step 2. Calculation of the reflectance curve of the area of the sample 300: Herein, the reflectance curve $R(\lambda)$ is considered to be a spectrum that represents, in percentage (%), the quantity of light reflected by the area of the sample 300 at each wavelength $\lambda$, said reflected light containing the scattered light from the area of the sample and also the specular component reflected from the area of the sample, if/when said specular component is present. The reflectance curve of the area of the sample 300 is calculated by the computing device as follows:

$$R(\lambda)(\%) = \frac{I(\lambda) - B(\lambda)}{W(\lambda) - B(\lambda)} \cdot 100 \qquad \text{(eq. 1)}$$

where $W(\lambda)$ is the spectrum of the area of the white reference, $I(\lambda)$ is the spectrum of the area of the sample and $B(\lambda)$ is the spectrum of the background, measured as referred above, all expressed in the same units (e.g. spectrometer counts, optical power or spectral power density, among others).

Step 3: Calculation of the tristimulus values X, Y, Z: From the reflectance curve of the area of the sample 300, the tristimulus values X, Y and Z of said area of the sample 300 are calculated by the computing device using the following standard expressions, established by the CIE—International Commission on Illumination [ref. 4, ref. 5]:

$$X = k \int_{\lambda_1}^{\lambda_2} S(\lambda)\bar{x}(\lambda)R(\lambda)d\lambda \qquad \text{(eq.2)}$$

$$Y = k \int_{\lambda_1}^{\lambda_2} S(\lambda)\bar{y}(\lambda)R(\lambda)d\lambda$$

$$Z = k \int_{\lambda_1}^{\lambda_2} S(\lambda)\bar{z}(\lambda)R(\lambda)d\lambda$$

$$k = \frac{100}{\int_{\lambda_1}^{\lambda_2} S(\lambda)\bar{y}(\lambda)d\lambda} \qquad \text{(eq. 3)}$$

where $S(\lambda)$ is the normalized spectrum of a CIE standard illuminant (i.e. the theoretical spectrum of a type of light source established as standard by the CIE). Examples of CIE standard illuminants are A—incandescent, D65—daylight and F2—fluorescent, among others. $\bar{x}(\lambda)$, $\bar{y}(\lambda)$, $\bar{z}(\lambda)$ are the tristimulus spectral responses of a CIE standard observer, which represent how an average person sees color across the visible spectrum. Different CIE standard responses for $\bar{x}(\lambda)$, $\bar{y}(\lambda)$, $\bar{z}(\lambda)$ are known as 2° Observer (CIE 1931) and 10° Observer (CIE 1964). $\lambda_1$ and $\lambda_2$ correspond to a first wavelength (ranging preferably from 370 to 460 nm) and to a second wavelength (ranging preferably from 620 to 780 nm), respectively. k is a normalizing constant.

The X, Y, Z values related to the reflectance of the area of the white reference, named $X_n$, $Y_n$, $Z_n$, are calculated as well with the above equations using the same CIE standard illuminant and same CIE standard observer, or alternatively may be considered as given or predetermined properties of the white references.

Step 4: Calculation of the color coordinates in a color space, such as CIEXYZ, CIE L*a*b*; CIE L*Ch or HUNTER Lab, among others. As an example, in the case of the CIE L*a*b* space, coordinates L*, a* and b* of the area of the sample are calculated by the computing device, using the following expressions:

$$L^* = 116(Y/Y_n)^{1/3} - 16 \qquad \text{(eq. 4a)}$$

$$a^* = 500[(X/X_n)^{1/3} - (Y/Y_n)^{1/3}] \qquad \text{(eq. 4b)}$$

$$b^* = 200[(Y/Y_n)^{1/3} - (Z/Z_n)^{1/3}] \qquad \text{(eq. 4c)}$$

Figure 3B:
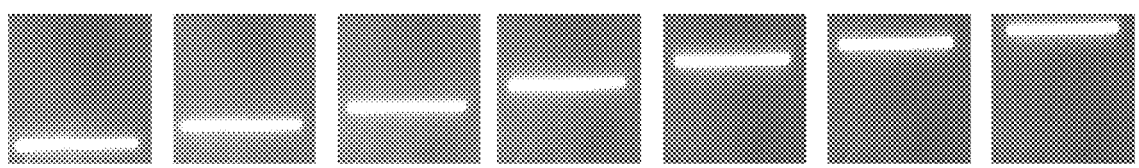
Figure 3C:
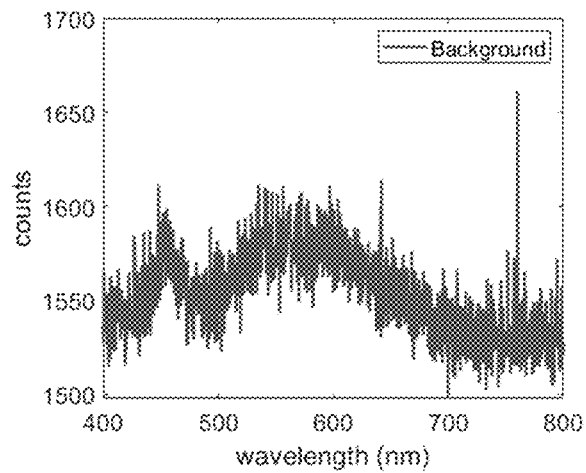
Figure 3D:
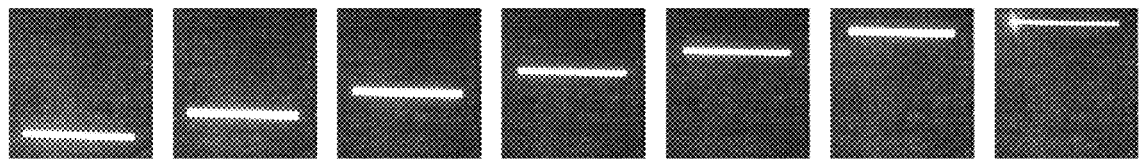
Figure 3E:
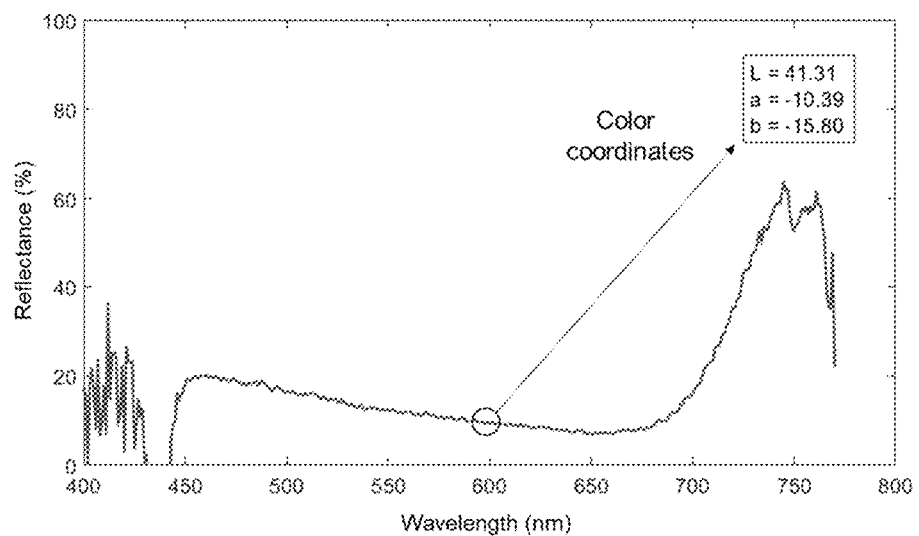

FIGS. 3A-E illustrate an example of the procedure to obtain the color coordinates of an area of a textile sample, as described above. Said example concerns an embodiment wherein the optical arrangement comprises a collimator, galvanometric mirrors and an electromechanical shutter. In said example, the sample is illuminated by the collimated beam of a fiber optic supercontinuum source, that, in the visible range, emits simultaneously a band of wavelengths from 430 to 780 nm. In said example, the optical spectra are recorded by a commercial optical spectrometer, model OCEAN-HDX-VIS-NIR, from the company Ocean Insight. The following parameters are considered in said example: area of the sample: 10×10 cm²; distance of the sample from the collimating lens: in the range from 0.95 to 1 m for all positions of the beam in the area of the sample; visible spectrum range: 430-780 nm; brightness of the collimated beam (composed of all wavelengths from 430 to 780 nm) at a distance of 1 m from the collimating lens: 136 mW/cm²; spectrum integration time, $T_H$: 11.93 ms; time of flight, $T_L$: 0.57 ms; number of scanned lines: 50; scanning time of the total area: 0.62 s. In the same example, the computing device is configured to determine color coordinates of the area of the sample for CIE standard illuminants A, B, D50, D65, F2; CIE standard observers 2° and 10°; standard color coordinates spaces CIEXYZ, CIEL*ab; CIEL*Ch; HUNTERLab; and to determine standard ASTM E313 Whiteness and Yellowness Indices;

First, the perimeter, as shown in FIG. 3A, of the area of a textile white reference is illuminated for the determination of the spectrum integration time $T_H$, which results in a value of $T_H$=11.93 ms. Next, in the same example the area of the white reference is scanned line-by-line, as illustrated in FIG. 3B (where 7 lines of a total of 50 are shown). The time to perform the complete scan of each line corresponds to the integration time $T_H$ of 11.93 ms, and the time of flight $T_L$ (time that the scanning galvanometer mirrors take to translate the collimated beam from the last point of one line to the first point of the next line) is of 0.57 ms. Simultaneously, in the same example the spectrometer records a spectrum for each scanning line. Next, in the example the illuminating beam is blocked with an electromechanical shutter placed between the collimator and the galvanometric mirrors, and the background spectrum is recorded (FIG. 3C). Next, the area of the textile sample of which the color coordinates are to be obtained is scanned line-by-line, as illustrated in FIG. 3D (where 7 lines of a total of 50 are shown). In this example, conditions of integration time $T_H$, time of flight $T_L$, number of lines, area of the sample and position of the sample relative to the end of the collimator and to the galvanometric mirrors are the same as in the previous scanning procedure of the white reference. Simultaneously, in the example the spectrometer records a spectrum for each scanning line. Next, in the example the computing device calculates the average spectrum of the 50 lines of the white reference and the average spectrum of the 50 lines of the textile sample. Finally, following equations eq. 1-eq. 4a, 4b, 4c referred above, in the example the computing device calculates a reflectance curve (FIG. 3E) and, from said reflectance curve, calculates the color coordinates of the area of the sample. In the case illustrated in FIG. 3E, said color coordinates are calculated in the CIE L*a*b color space, for illuminant D50 and observer 2°, being L*=41.31, a*=−10.39, b*=−15.80.

Figure 4A:
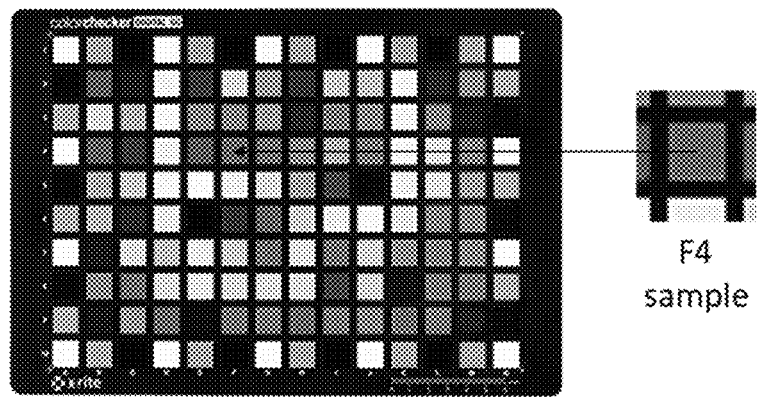
FIG. 4A shows an example of a standard palette for color reference, where the square in position F4 is selected for the determination of its color coordinates using an embodiment of the present invention.
Figure 4B:
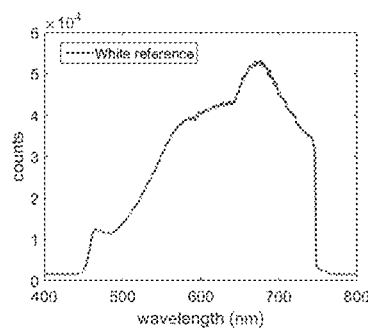
FIGS. 4B-4G illustrate measured and calculated spectra for the determination of color coordinates of sample F4 (a type of green color) in FIG. 4A, using an embodiment of the system and method of the present invention.
Figure 4C:
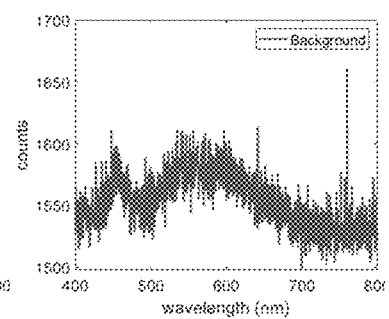
Figure 4D:
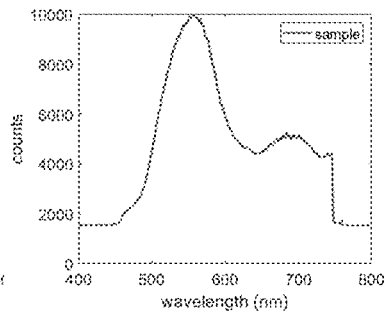
Figure 4E:
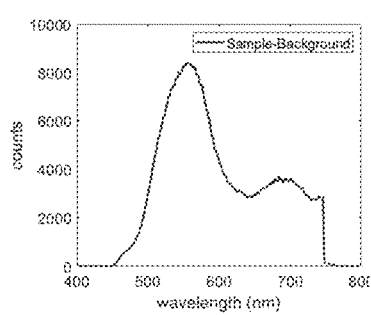
Figure 4F:
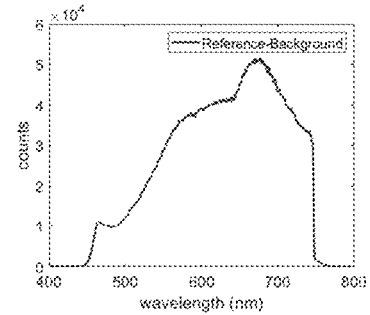
Figure 4G:
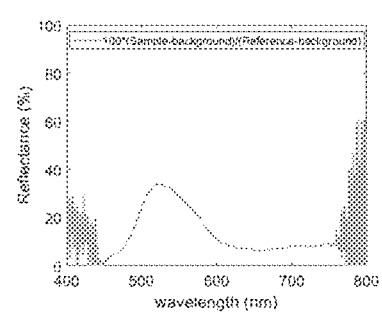

To further evaluate the utility of the present invention to determine color coordinates of areas of samples made of arbitrary materials, the procedure explained above has been followed to calculate the color coordinates of standard samples used by the Industry for color referencing. As an example, FIG. 4A shows a standard palette for color referencing, of colored squares made of a synthetic material coated with semigloss paint, model ColorChecker Digital SG, July 2019 edition, supplied by the company X-Rite. The colored square of said palette in position F4 (of green color) has been selected for the determination of its color coordinates using the present invention. The same measurement procedure explained for the textile sample of FIG. 3 has been used, considering in this case as white reference the colored square in position F1 in the palette, and the following parameters: area of the sample: 13×13 mm²; distance of the sample from the collimating lens: in the range from 0.95 to 1 m for all positions of the beam in the area of the sample; visible spectrum range: 430-780 nm; spectrum integration time, $T_H$: 1.55 ms; time of flight, $T_L$: 0.07 ms; number of lines: 6; scanning time of the total area: 9.72 ms. FIGS. 4B-4G illustrate measured and calculated spectra of said procedure, where FIG. 4B is a white reference spectrum, FIG. 4C is a background spectrum, FIG. 4D is a spectrum of the sample, FIG. 4E is a calculated spectrum resulting from subtracting the background spectrum from the spectrum of the sample, and FIG. 4F is a calculated spectrum resulting from subtracting the background spectrum from the white reference spectrum. From the reflectance spectrum obtained (FIG. 4G), for an angle of observation α=0° (the meaning of angle of observation α is explained later in the text), color coordinates of colored square F4 in the CIE L*a*b* color space, illuminant D50, observer 2°, are calculated as L*=94.2, a*=−6.11, b*=5.55.

In some embodiments, the reference spectrum may be a reference overall optical spectrum. The latter preferably is calculated similarly to calculating the overall optical spectrum of the sample. Therefore, in an embodiment the method applied for calculating the overall optical spectrum of the area of the sample, is applied on a reference sample, e.g. on a white reference sample, for calculating an overall reference optical spectrum.

Figure 5:
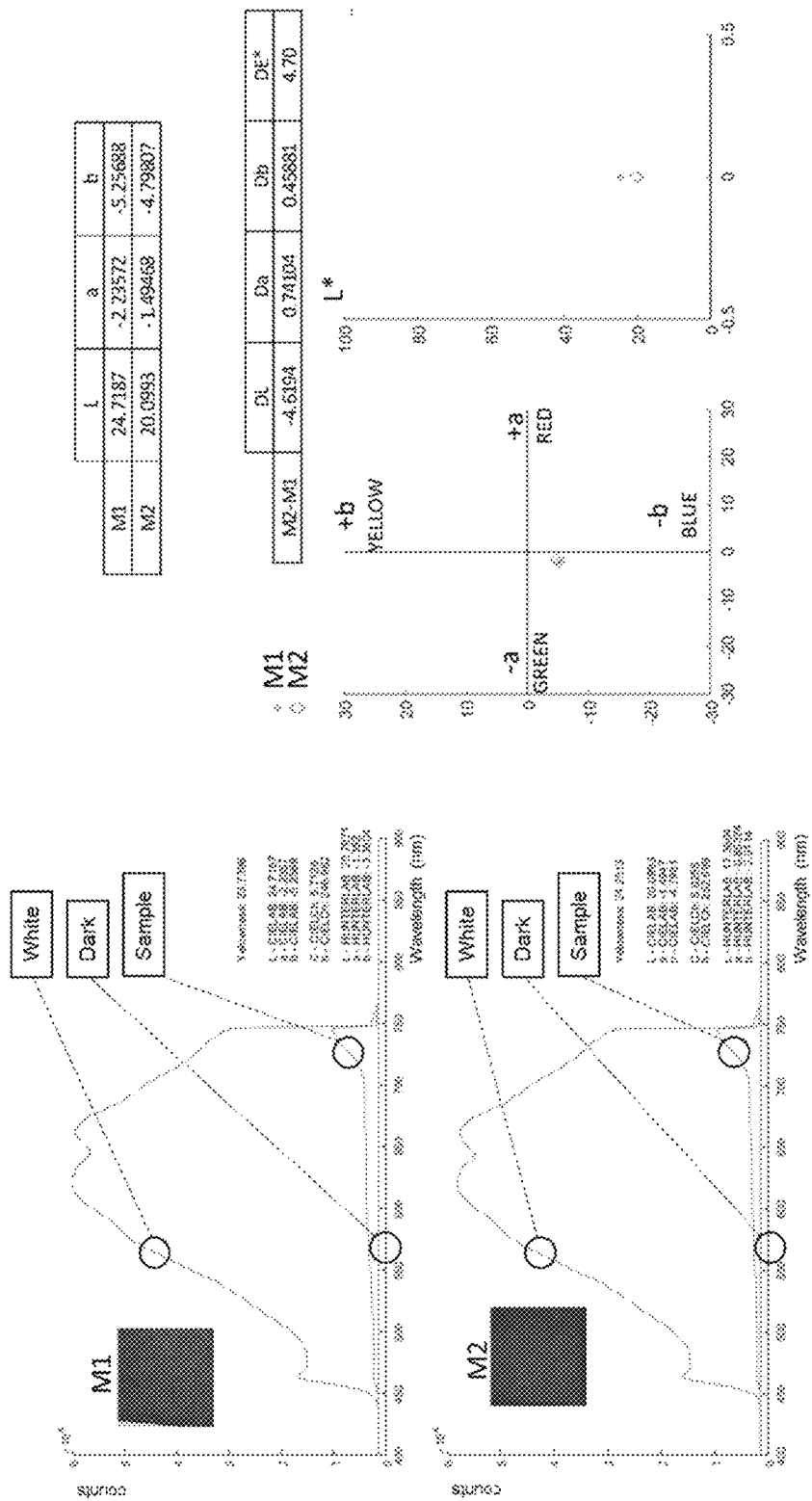
FIG. 5 shows measured spectra and consequent calculated color coordinates and other color parameters in different color spaces of 2 textile samples of different type and equal area, as obtained with an embodiment of the invention, wherein the color coordinates of both samples, calculated in the CIE L*ab space are positioned in a graphical representation of the CIE L*ab space (L*, a, b axis), and the color difference between both samples is represented by values of ΔL, Δa, Δb and ΔE.

The utility of the invention referred herein to measure the color of areas of samples can be applied to multiple purposes, such as quality inspection in manufacturing processes, development of painting materials, industrial sorting, material inspection for recycling or classification, among others. Particularly, an example of the use of present invention to discriminate samples on account of their difference in color is illustrated in FIG. 5. The latter shows measured spectra and consequent calculated color coordinates and other color parameters in different color spaces of 2 textile samples of different type and of equal area (samples of references M1 and M2, respectively). In the example of FIG. 5, color coordinates of both samples are calculated in the CIE L*a*b*; CIE L*Ch and HUNTER Lab. The ASTM E313 Yellowness parameter is calculated as well for both samples. Particularly, their color coordinates calculated in the CIE L*ab space are positioned in a graphical representation of the CIE L*ab space (L*, a, b axis). In the example, color difference between both samples is represented by values of ΔL, Δa, Δb and ΔE, where $\Delta E = \sqrt{(\Delta L)^2 + (\Delta a)^2 + (\Delta b)^2}$. It should be clarified that notation for parameters L*, a*, b* and ΔE* throughout the present text and figures can be referred equally as L, a, b, and ΔE, respectively (without the symbol *). Terms "White" and "Dark" in FIG. 5 refer to "white reference" and "background", respectively.

FIG. 6 shows pictures of the light scattered by textile samples when illuminated by the collimated beam of the supercontinuum light source of an embodiment of the present invention, wherein in said embodiment the optical arrangement comprises a collimator, and the beam transversal section diameter ($1/e^2$) on the samples is between 2.1 and 5.3 mm for all wavelengths from 430 to 780 nm. In the same embodiment, the distance of the samples from the collimating lens is between 0.95 and 1 m for all positions of the beam in the sample. From left to right in FIG. 6: 1) Static incidence of the beam on a white reference textile sample; 2) Dynamic incidence of the beam on the same white reference textile sample, scanning a line of 10 cm length during a time (integration time $T_H$) of 11.93 ms; 3) Static incidence of the beam on a textile sample under test (to obtain its color coordinates); 4) Dynamic incidence of the beam on the same textile sample under test, scanning a line of 10 cm length during a time (integration time $T_H$) of 11.93 ms.

With regard to FIG. 7, therein it is shown how the proposed system allows multiangle (multi-angle) color measurement (i.e. the system offers the capability of measuring color at different angles of observation).

Figure 7A:
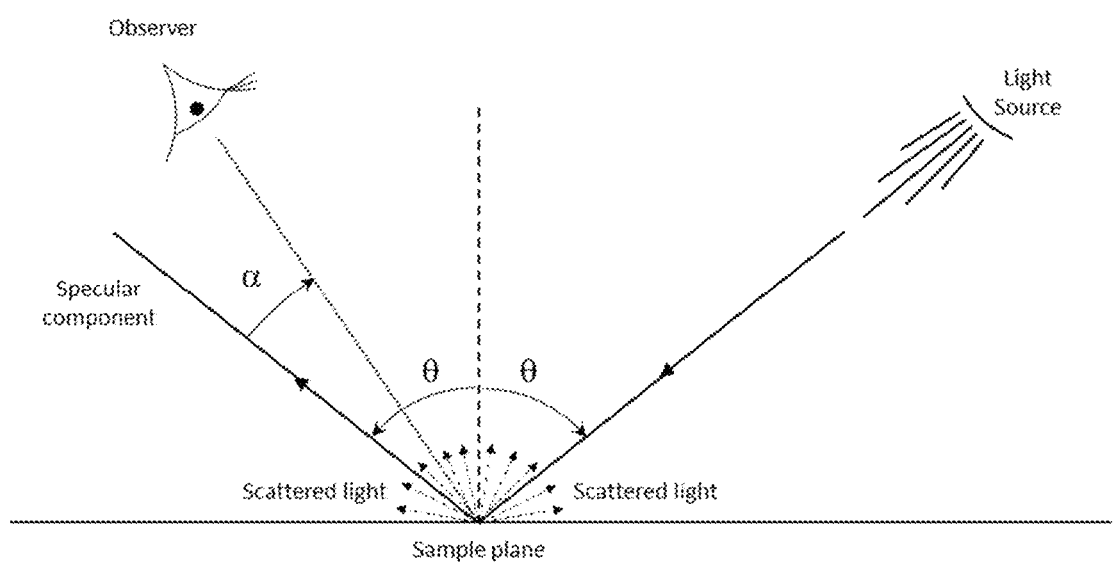
FIG. 7A describes a case wherein there is a dependence of perception of color on the relative orientation between illuminating source, sample and observer.

As known, the color of a sample perceived by an observer may depend on the relative orientation between illuminating source, sample and observer. The same sample, illuminated by the same light source and observed by the same observer may be perceived to be of a different color from one observation to another if the angle of incidence and/or the angle of observation from the direction normal to the sample change(s) from one observation to the other. This effect may be particularly relevant in the case of partially reflective samples, where the specular component of the light reflected by the sample may hide the "real" color of the sample. FIG. 7A illustrates this effect, where θ is the angle of incidence of the light (i.e, the angle formed between the direction of propagation of the illuminating light and the direction normal to the sample plane). The angle of reflection of the specular component is equal to θ, while the scattered light from the sample is propagated in all directions. Information of the "real" color of the sample is carried by the scattered light. Hence, to perceive the "real" color of the sample, the observer should preferably move away from the θ direction, and move to an angle α (angle of observation relative to the direction of the specular component.) The higher α, the less intensity of specular component is received by the observer.

In standard known systems to measure color, the illuminating source and the observer are situated at θ=0° and α=45°, respectively (configuration 0/45), to minimize the effect of the specular component. These systems, however, miss the valuable information of color values perceived at other angles of observation, which is highly appreciated in different industrial sectors, like the automotive. Systems that offer the capability of measuring color at different angles of observation are called "multiangle". In known multiangle systems to measure color, the number of angles of observation is discrete and limited, they require several sources of illumination placed in different positions and several receptors placed in different positions. Besides, the area of illumination in known systems is of few cm².

Figure 7B:
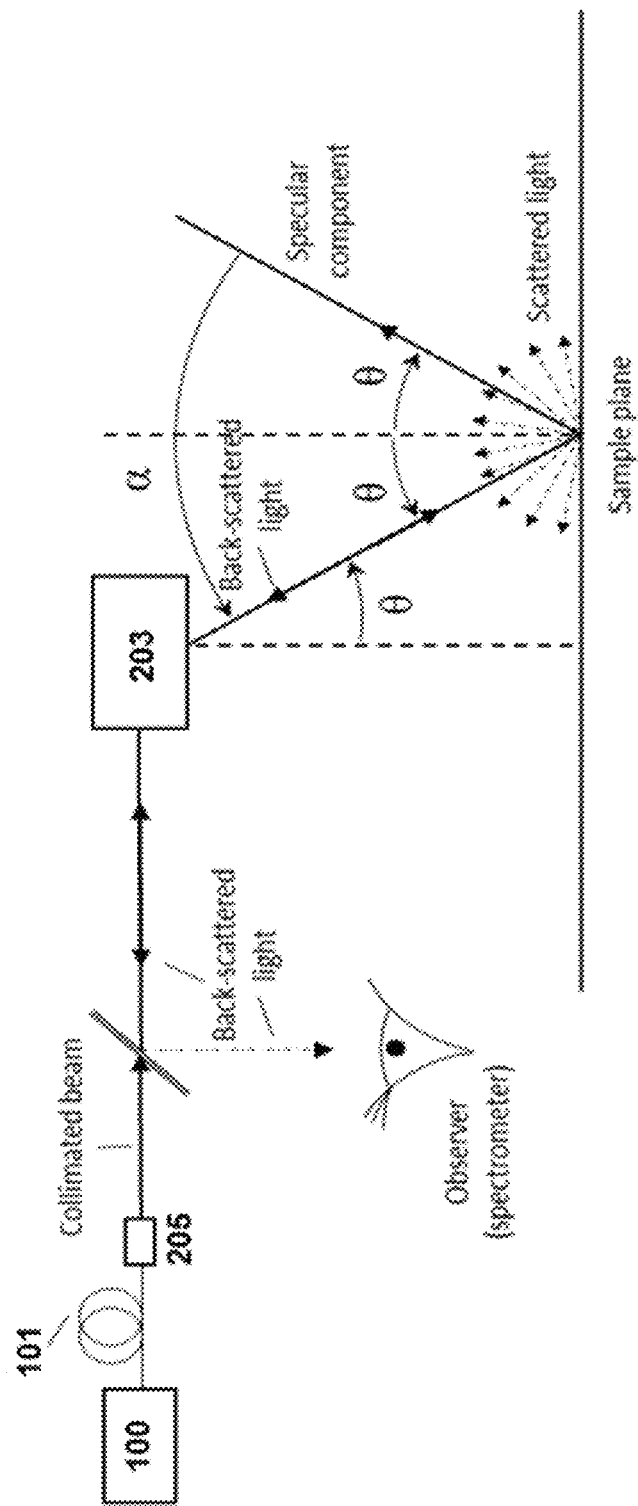
FIG. 7B illustrates the utility of an embodiment of the current invention to obtain the color coordinates of a sample for every angle of observation α from 0 to a maximum angle $α_{max}$, being $α=2*θ$.

On the contrary, as illustrated in FIG. 7B, the system of the present invention to measure the color of an area of a sample may be a multiangle system that may provide a plethora of angles of observation, preferably continuously varied, preferably using a single source of illumination placed at a single position and a single receptor placed at a single position. Besides, the area of illumination in the present system, obtained by scanning the sample part-by-part with the collimated beam, preferably can be selected from being few mm² (the size of the transversal section of the beam, e.g. 22 mm², for a diameter of 5.3 mm) to being more than 1 m² (e.g. 100 lines of >1 m length with distance steps between them of >1 cm).

In the embodiment described in FIG. 7B, a fixed single light source is used, and there is a fixed single observer (the spectrometer 400/eye). In FIG. 7B the optical device 203 (e.g. two x-y galvanometer mirrors) may orient the illuminating light beam with an angle of incidence θ, equivalent to the angle θ in FIG. 7A, which can be varied freely by the voltage applied on the optical device 203. In the embodiment in FIG. 7B, the collecting optics of the proposed system may collect the back-scattered light from the sample 300, i.e. the light that is scattered by the sample 300 in the direction that is opposite to the direction of the illuminating light beam, and redirect it towards the observer always in the same direction, independently of the angle of incidence θ. Therefore, in the embodiment in FIG. 7B the angle of observation α is always equal to 2*θ, and can be varied freely and continuously by the voltage applied in the optical device 203, from 0° to a maximum angle $\alpha_{max}$. Theoretically $\alpha_{max}$ is 180°, but practically $\alpha_{max}$ is determined by the maximum scan angle that the optical device 300 can technically provide (±0.42 rad in a particular case where a galvo system © SCANLAB 7 mm Scan Kit AlO is used, thusly having full angle 0.84 rad, $\theta_{max}$=48.1°, $\alpha_{max}$=96.2°). Particularly, when θ is 22.5°, α is 45°, which is equivalent to the configuration 0/45 in the standard systems, where the observer moves away 45° from the specular component.

Figure 7C:
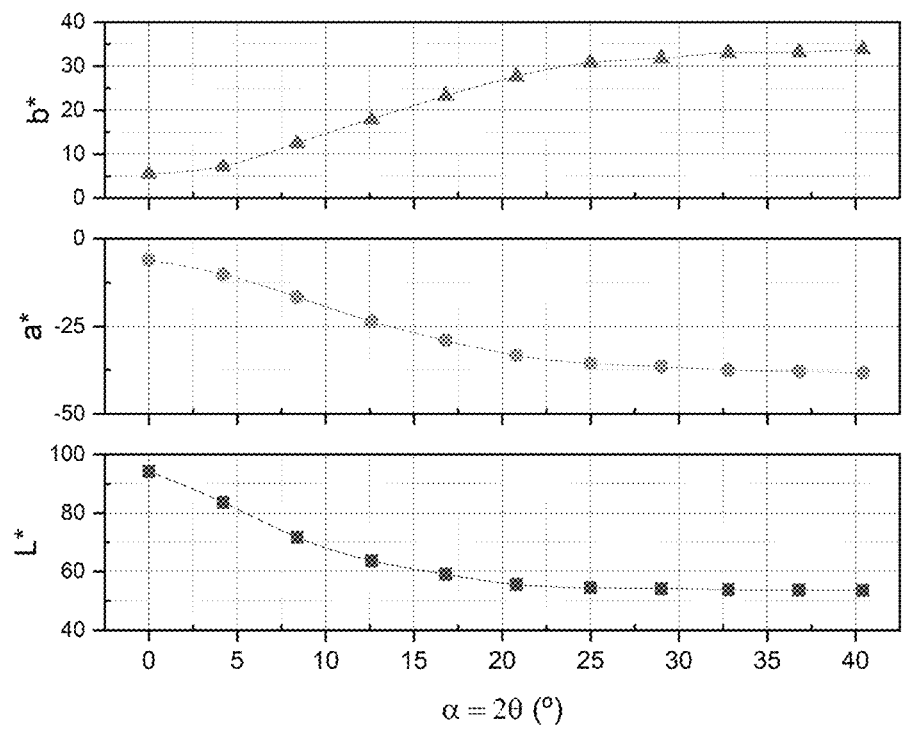
FIG. 7C illustrates the color coordinates L*, a* and b* (CIE L*ab) of the sample of position F4 in the color palette shown in FIG. 4A, for angles of observation α from 0 to 40.4°, measured with an embodiment of the current invention. Illuminant D50, observer 2°.

As an example of a multi-angle color measurement, FIG. 7C illustrates the color coordinates of the colored square sample in position F4 of the color palette shown in FIG. 4A, for angles of observation α from 0 to 40.4°, measured with an embodiment of the current invention. Said color coordinates in FIG. 7C are coordinates L*, a* and b* of the CIE L*a*b* color space, Illuminant D50 and observer 2°. The following parameters have been considered for the measurement in FIG. 7C: scanned area of the sample: 13×13 mm²; distance of the sample from the collimating lens: longer than 0.95 m for all positions of the beam in the scanned area of the sample; visible spectrum range: 430-780 nm; spectrum integration time, $T_H$: 1.55 ms; time of flight, $T_L$: 0.07 ms; number of scanned lines: 6; scanning time of the total area: 9.72 ms. For the purpose of further clarity, it should be understood that the angle of observation α represented in graphs of FIG. 7C is the angle of observation α corresponding to an incidence of the collimated beam in the central point of the scanned area of the colored squared sample.

Figure 8:
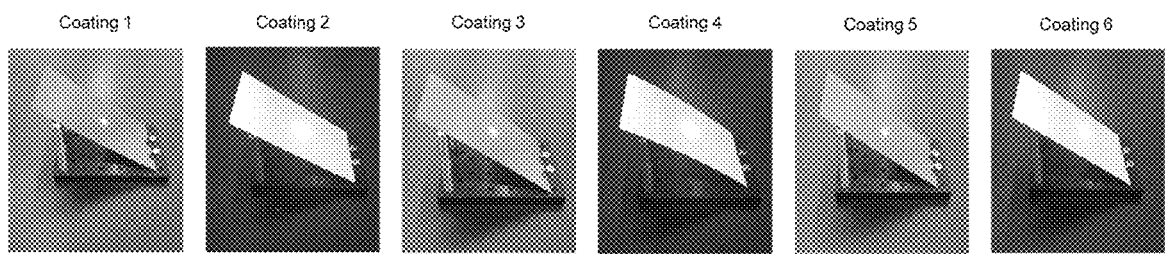
FIG. 8 shows pictures of samples of aluminum sheets coated with different painting pigments, illuminated by the collimated beam of the supercontinuum light source of an embodiment of present invention.

To illustrate another example of the use of present invention for discriminating samples on account of their difference in color, FIG. 8 shows pictures of samples of aluminum sheets coated with different painting pigments, illuminated by the collimated beam of the supercontinuum light source of an embodiment of present invention. Table I below collects the color coordinates of the samples in FIG. 8, measured with the system and method of present invention, for an angle of observation α of 60°, for 2 different samples of each type of coating. Color difference between each pair of samples is also calculated, and represented in Table I by values of ΔL*, Δa*, Δb* and ΔE. Color coordinates in this example are coordinates L*, a* and b* of the CIE L*a*b* color space, Illuminant D50 and observer 2°. The measurement in the example concerning FIG. 8 is done in a static configuration (the collimated beam is maintained in the same direction during the measurement of a single spectrum), which is equivalent to a dynamic configuration where the area of the sample is scanned by only one single line, where said line is formed by only one single point/spot (of finite size). Thus, concerning FIG. 8 the area of the sample corresponds to the area of the transversal section of the beam in the sample: 22.1 mm²; the distance of the sample from the collimating lens is between 0.99 and 1 m; the visible spectrum range of the source is 430-780 nm; the spectrum integration time $T_H$ of the single spectrum recorded is 0.63 ms. The color coordinates in Table I are calculated from said single spectrum recorded.

TABLE I

| Coating type | Color coordinates sample 1 | | | Color coordinates sample 2 | | | Color coordinates difference between sample 1 and sample 2 | | | |
|---|---|---|---|---|---|---|---|---|---|---|
| | L* | a* | b* | L* | a* | b* | ΔL* | Δa* | Δb* | ΔE |
| 1 | 22.82 | −25.63 | 1.49 | 22.47 | −26.30 | 1.64 | −0.35 | −0.67 | 0.16 | 0.77 |
| 2 | 90.77 | −0.03 | 0.13 | 90.39 | −0.04 | 0.99 | −0.38 | −0.01 | 0.86 | 0.94 |

TABLE I-continued

| Coating type | Color coordinates sample 1 | | | Color coordinates sample 2 | | | Color coordinates difference between sample 1 and sample 2 | | | |
| --- | --- | --- | --- | --- | --- | --- | --- | --- | --- | --- |
| | L* | a* | b* | L* | a* | b* | ΔL* | Δa* | Δb* | ΔE |
| 3 | 24.75 | −4.16 | −0.52 | 25.80 | −4.36 | −0.22 | 1.05 | −0.19 | 0.31 | 1.11 |
| 4 | 91.43 | 0.52 | −0.01 | 90.77 | 0.58 | 0.47 | −0.66 | 0.06 | 0.48 | 0.82 |
| 5 | 19.44 | 3.91 | 18.82 | 18.62 | 3.80 | 18.26 | −0.81 | −0.11 | −0.56 | 0.99 |
| 6 | 80.34 | 3.00 | 14.03 | 80.16 | 3.68 | 13.60 | −0.18 | 0.68 | −0.43 | 0.83 |

Figure 9:
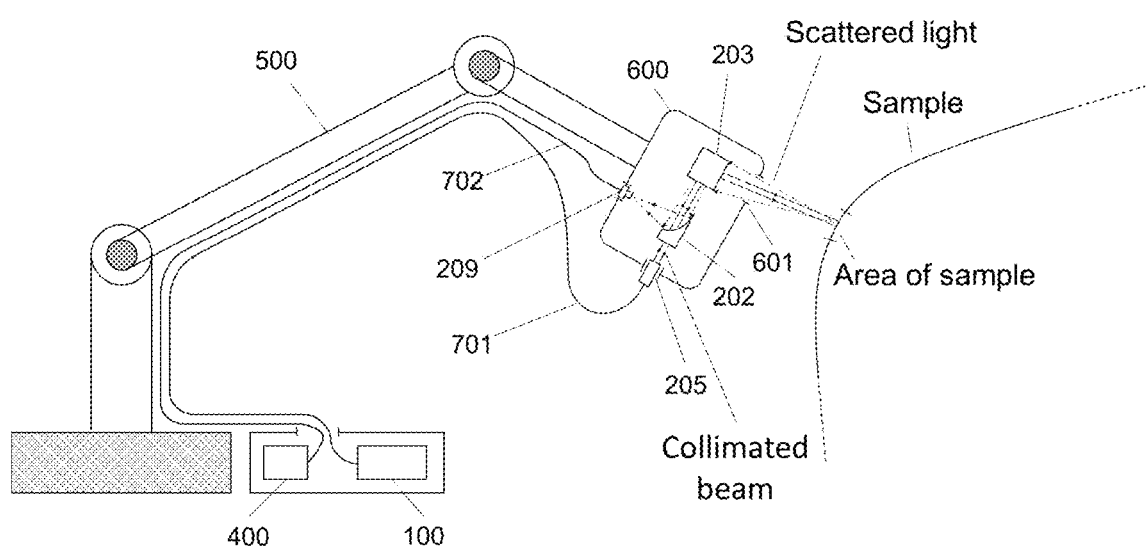
FIG. 9 shows an embodiment of a robot according to the invention.

FIG. 9 shows an embodiment of a robot according to the invention. In FIG. 9 the robot comprises a robotic arm 500 that is movable and has a robotic head 600 at a first end of the robotic arm. As shown in FIG. 9 the system comprises an optical arrangement 200 that is similar to the one of the embodiment of FIG. 1 and comprises the collimator 205, the optical device 203 and the parabolic mirror 202 which has a hole that is a coaxial hole. FIG. 9 shows that at the robotic head there are a collimator 205 that is connected to the optical source 100 via a first optical fiber 701, the optical device 203 which is as in the embodiment of FIG. 1, the parabolic mirror 202 with the coaxial hole, a coupler 209 configured for coupling collected scattered light to a second optical fiber. In the embodiment of FIG. 9 the parabolic mirror 202 is configured to allow the passage of the spatially coherent light from the collimator 205 towards the optical device 203 via the hole, as well as to allow the collection and redirection of the scattered light from the sample towards the coupler 209, and hence, via the coupler 209 and the second optical fiber 702 towards the optical spectrometer 400. The first optical fiber 701 in the system of FIG. 9 is configured for guiding light to the collimator. This first optical fiber 701 may be part of the light source 100. The second optical fiber 702 in the embodiment of FIG. 9 is configured for guiding said coupled scattered light from the coupler 209 towards the optical spectrometer 400. As shown in FIG. 9 parts of the first and second optical fibers 701, 702 may run along the robotic arm 500. The embodiment of FIG. 9 may be used for measuring the color of an area of a sample of a car's body or of a component of a car. Hence, the embodiment of FIG. 9 can be part of a car or car component inspection or production line. As shown in FIG. 9 the robotic head 600 may comprise an opening 601 that is configured to allow the passage of the collimated beam towards the sample and to allow the passage of the scattered light towards the optical arrangement. Likewise, the robotic head may enclose the optical arrangement of the system. Therefore, the robotic head with the opening may advantageously allow for protecting the optical arrangement from being damaged.

While the foregoing is directed to embodiments of the present invention, other and further embodiments of the invention may be devised without departing from the basic scope thereof. For example, other aspects may be implemented in hardware or software or in a combination of hardware and software.

Additionally, the software programs included as part of the invention may be embodied in a computer program product that includes a computer useable medium, for example, a readable memory device, such as a hard drive device, a flash memory device, a CD-ROM, a DVD/ROM, or a computer diskette, having computer readable program code segments stored thereon. The computer readable medium can also include a communications link, either optical, wired, or wireless, having program code segments carried thereon as digital or analog signals.

The scope of the present invention is defined in the following set of claims.

NON-PATENT REFERENCES

[ref. 1] C. K. Hitzenberger, M. Danner, W. Drexler and A. F. Fercher, "Measurement of the spatial coherence of superluminescent diodes," Journal of Modern Optics, 46:12, 1763-1774 (1999).

[ref. 2] K. Saastamoinen, J. Tervo, J. Turunen, P. Vahimaa, and A. T. Friberg, "Spatial coherence measurement of polychromatic light with modified Young's interferometer," Optics Express, 21:4, 4061-4071 (2013).

[ref. 3] ISO Standard 11146, "Lasers and laser-related equipment—Test methods for laser beam widths, divergence angles and beam propagation ratios" (2005)

[ref.4] COLORIMETRY—PART 3: CIE TRISTIMULUS VALUES, ISO/CIE 11664-3:2019(E) http://cie.co.at/publications/colorimetry-part-3-cie-tristimulus-values-2

[ref. 5] CIE 1931 color space, article in Wikipedia, https://en.wikipedia.org/wiki/CIE 1931 color space

[ref. 6] A. Ifarraguerri, N. Conyers Wyeth, B. Gorin, "Optical design for an active standoff spectrometer with a broadband source", Optical Engineering, vol. 59(9), 092006 (2020)

The invention claimed is:

1. A system to measure the color of an area of a sample, comprising:
a light source configured to emit light to illuminate a sample;
an optical arrangement configured to receive said light, to output and direct a collimated beam of said light towards the sample located at a given distance, and to collect scattered light from said sample upon said illumination, the optical arrangement comprising an optical device configured to change and dynamically orient a direction of the light towards the sample thereby scanning an area of said sample, part-by-part;
an optical spectrometer configured to receive the collected scattered light and to record an optical spectrum of the scattered light for each part; and
a computing device operatively connected to the optical spectrometer;
wherein the light emitted by the light source comprises a broad spectrum of wavelengths which are emitted simultaneously, and said broad spectrum covers, continuously, at least a band of wavelengths within the visible range, from a first wavelength to a second wavelength;
the light emitted by the light source is spatially coherent, for at least all the wavelengths of the band wavelengths from the first wavelength to the second wavelength;
the optical arrangement, for outputting the collimated beam, is configured to preserve collimated said spatially coherent light if the latter is collimated, or said optical arrangement further comprises a collimator to perform a collimation of the spatially coherent light;

wherein the system is configured for, when the optical device scans the area, synchronizing the scanning of said area with the recording by the optical spectrometer of the optical spectra for the parts of the area, and for the recording of the optical spectrum of each part lasting an optical spectrum integration time that is equal to the duration of the scan of said part by the optical device;

the computing device is configured to determine color coordinates of the area of the sample in a given color space, by computing an overall optical spectrum from a statistical calculation over all or some of the optical spectra corresponding to all or some of the scanned parts of the area, and by analyzing the overall optical spectrum, said analyzing comprising calculating the XYZ Tristimulus values corresponding to said overall optical spectrum;

and wherein the first wavelength is in a range between 370 nm-460 nm, and the second wavelength is in a range between 620 nm-780 nm.

2. The system to measure the color of an area of a sample according to claim 1, wherein the optical arrangement is configured to operate without spectrally modulating the light it receives from the light source.

3. The system to measure the color of an area of a sample according to claim 1, wherein the collimated beam has a full-angle angular divergence of 0.46 degrees or less, for all the wavelengths from the first wavelength to the second wavelength.

4. The system to measure the color of an area of a sample according to claim 1, wherein the light source is a supercontinuum light source.

5. The system to measure the color of an area of a sample according to claim 1, wherein a diameter of a transversal section of the collimated beam, for all the wavelengths from the first wavelength to the second wavelength is 10 mm or less at any distance of 1 m or less from a point at the optical arrangement, or 100 mm or less at any distance of 10 m or less from said point at the optical arrangement, the diameter being considered at $1/e^2$ width, said point being at the collimator when the optical arrangement comprises said collimator.

6. The system to measure the color of an area of a sample according to claim 1, wherein a brightness of the collimated beam, composed of all the wavelengths from the first wavelength to the second wavelength, is of 1 mW/cm$^2$ or higher at any distance of 1 m or less from a point at the optical arrangement, or of 0.01 mW/cm$^2$ or higher at any distance of 10 m or less from said point at the optical arrangement, said point being at the collimator when the optical arrangement comprises said collimator.

7. The system to measure the color of an area of a sample according to claim 1, wherein the optical device comprises an XY galvanometric mirror, and wherein the optical arrangement further comprises a parabolic mirror with a hole located between the collimator and the optical device, said parabolic mirror configured to allow the passage of the spatially coherent light towards the optical device via the hole, as well as to allow the collection and redirection of the scattered light from the sample towards the optical spectrometer, and to prevent the passage towards the optical spectrometer of light coming from direct reflection at the sample, wherein the optical device is further configured to redirect the scattered light from the sample towards the parabolic mirror, the latter further being configured to redirect the scattered light towards the optical spectrometer.

8. A robot comprising a system to measure the color of an area of a sample, the system comprising:

a light source configured to emit light to illuminate a sample;

an optical arrangement configured to receive said light, to output and direct a collimated beam of said light towards the sample located at a given distance, and to collect scattered light from said sample upon said illumination, the optical arrangement comprising an optical device configured to change and dynamically orient a direction of the light towards the sample thereby scanning an area of said sample, part-by-part;

an optical spectrometer configured to receive the collected scattered light and to record an optical spectrum of the scattered light for each part; and a computing device operatively connected to the optical spectrometer;

wherein the light emitted by the light source comprises a broad spectrum of wavelengths which are emitted simultaneously, and said broad spectrum covers, continuously, at least a band of wavelengths within the visible range, from a first wavelength to a second wavelength;

the light emitted by the light source being spatially coherent, at least for all the wavelengths of the band from the first wavelength to the second wavelength;

the optical arrangement, for outputting the collimated beam, is configured to preserve collimated said spatially coherent light if the latter is collimated, or said optical arrangement further comprises a collimator to perform a collimation of the spatially coherent light;

wherein the system is configured for, when the optical device scans the area, synchronizing the scanning of said area with the recording by the optical spectrometer of the optical spectra for the parts of the area, and for the recording of the optical spectrum of each part lasting an optical spectrum integration time that is equal to the duration of the scan of said part by the optical device;

the computing device is configured to determine color coordinates of the area of the sample in a given color space, by computing an overall optical spectrum from a statistical calculation over all or some of the optical spectra corresponding to all or some of the scanned parts of the area, and by analyzing the overall optical spectrum, said analyzing comprising calculating the XYZ Tristimulus values corresponding to said overall optical spectrum; and wherein the first wavelength is in a range between 370 nm-460 nm, and the second wavelength is in a range between 620 nm-780 nm.

9. The robot according to claim 8, wherein the robot further comprises a movable robotic arm, and the optical arrangement of the system is at the robotic arm or at a robotic head which is comprised by the robot and is at an end of the robotic arm, the robotic head comprising an opening that is configured to allow the passage of the collimated beam towards the sample and to allow the passage of the scattered light towards the optical arrangement.

10. The robot according to claim 8, wherein the optical device comprises an XY galvanometric mirror, and wherein the optical arrangement further comprises a parabolic mirror with a hole located between the collimator and the optical device, said parabolic mirror being configured to allow the passage of the spatially coherent light towards the optical device via the hole, as well as to allow the collection and redirection of the scattered light from the sample towards the optical spectrometer, and to prevent the passage towards the optical spectrometer of light coming from direct reflection at the sample, wherein the optical device is further configured to redirect the scattered light from the sample towards the parabolic mirror, the latter further configured to redirect the scattered light towards the optical spectrometer.

11. The robot according to claim 8, wherein the system further comprises the collimator which is connected to the light source via a first optical fiber which is configured to guide towards the collimator the light emitted by light source, and the system further comprises a coupler that is connected to the optical spectrometer via a second optical fiber and is configured to couple the collected scattered light to the second optical fiber which is configured to guide towards the optical spectrometer the light coupled by the coupler, wherein the first and the second optical fibers are arranged along a length of the robotic arm.

12. A method for measuring the color of an area of a sample, comprising:
emitting light with a light source for illuminating a sample located at a given distance by the light source, the light comprising a broad spectrum of wavelengths that are emitted simultaneously, wherein the spectrum covers continuously, at least, a band of wavelengths within the visible range, from a first wavelength to a second wavelength, the light being spatially coherent, at least at all wavelengths from the first wavelength to the second wavelength;
receiving the spatially coherent light at an optical arrangement located at a distance from an end of the light source;
at the optical arrangement, preserving collimated the spatially coherent light if the latter is collimated, or collimating with a collimator said spatially coherent light;
outputting and directing, by the optical arrangement, a collimated beam of the spatially coherent light towards the sample that is located at a given distance from the optical arrangement, said distance preferably being 0.5 m or longer; scanning an area of the sample, part-by-part, by an optical device of the optical arrangement changing and dynamically orienting a direction of the directed collimated beam;
recording, by an optical spectrometer, an optical spectrum of scattered light collected from the sample for each part;
synchronizing the scanning of said area with the recording by the optical spectrometer of the optical spectra for the parts of the area, wherein the recording of the optical spectrum of each part lasting an optical spectrum integration time that is equal to the duration of the scan of said part by the optical device;
measuring, by a computing device operatively connected to the optical spectrometer, color coordinates of the area of the sample in a given color space by computing an overall optical spectrum from a statistical calculation over all or some of the optical spectra corresponding to all or some of the scanned parts of the area and by analyzing the overall optical spectrum, said analyzing comprising calculating the XYZ Tristimulus values corresponding to said overall optical spectrum;
wherein the first wavelength is in a range between 370 nm-460 nm, and the second wavelength is in a range between 620 nm-780 nm.

13. The method according to claim 12, wherein a time dependent voltage signal is used for performing said synchronizing.

14. The method according to claim 12, wherein the sample while being illuminated with the collimated beam further receives other light from the environment.

15. The method according to claim 12, wherein the first wavelength is in a range between 370 nm-460 nm, and the second wavelength is in a range between 620 nm-780 nm, and wherein:
the collimated beam has a maximum full-angle angular divergence of 0.46 degrees or less for all the wavelengths from the first wavelength to the second wavelength; and/or
a diameter of a transversal section of the collimated beam, for all the wavelengths from the first wavelength to the second wavelength is of 10 mm or less at any distance of 1 m or less from a point at the optical arrangement, or of 100 mm or less at any distance of 10 m or less from said point at the optical arrangement, the diameter being considered at $1/e^2$ width; and/or
a beam quality factor $M^2$ of the collimated beam, for all the wavelengths from the first wavelength to the second wavelength, is in a range between 1.0 and 2.0; and/or
a brightness of the collimated beam, composed of all the wavelengths from the first wavelength to the second wavelength, is of 1 $mW/cm^2$ or higher at any distance of 1 m or less from a point at the optical arrangement, or of 0.01 $mW/cm^2$ or higher at any distance of 10 m or less from said point at the optical arrangement;
and wherein when the optical arrangement comprises said collimator, said point at the optical arrangement is at the collimator.

16. The method according to claim 12, wherein the optical spectrum integration time is determined by performing the following steps:
continuously scanning, by the optical device, a portion, of an area of a white reference;
simultaneous to said scanning of the portion, recording, by the optical spectrometer, the optical spectrum with different optical spectrum integration times, which are increased progressively and discretely with a certain constant time difference; and
selecting, as the optical spectrum integration time, the maximum optical spectrum integration time for which the recorded optical spectrum is not saturated at any wavelength.

17. The method according to claim 12, wherein the XYZ Tristimulus values are calculated by:
computing a reflectance curve using the overall optical spectrum of the area of the sample, a reference overall optical spectrum of a white reference and a background spectrum;
multiplying the computed reflectance curve by a CIE standard illuminant spectral curve, by a CIE standard observer spectral curve and by a normalizing constant.

18. The method according to claim 12, wherein an angle of observation $\alpha$ is equal to $2*\theta$, where $\theta$ is the angle formed between the propagation direction of the collimated beam and the direction normal to the surface of the sample, and $\alpha$ is the angle of observation relative to the direction of the specular component reflected from the sample upon the incidence of the collimated beam on the surface of the sample, and the method further comprises using the optical device to vary the angle of observation $\alpha$ from 0 to a maximum angle $\alpha_{max}$, $\alpha_{max}$ being determined by a maximum scan angle that the optical device can provide, and measuring the color coordinates for each of a plurality of angles of observation $\alpha$ from 0 to said maximum angle $\alpha_{max}$.

19. The method according to claim 12, wherein the optical device comprises an XY galvanometric mirror, and wherein the optical arrangement further comprises a parabolic mirror with a hole located between the collimator and the optical device, said parabolic mirror allowing the passage of the spatially coherent light towards the optical device via the hole, as well as allowing the collection and redirection of the scattered light from the sample towards the optical spectrometer, and preventing the passage towards the optical spectrometer of light coming from direct reflection at the sample, wherein the optical device redirecting the scattered light from the sample towards the parabolic mirror, the latter redirecting the scattered light towards the optical spectrometer.

* * * * *